United States Patent
Bookbinder et al.

(10) Patent No.: US 9,488,774 B2
(45) Date of Patent: Nov. 8, 2016

(54) PRIMARY OPTICAL FIBER COATING COMPOSITION CONTAINING NON-RADIATION CURABLE COMPONENT

(71) Applicant: Corning Incorporated, Corning, NY (US)

(72) Inventors: Dana Craig Bookbinder, Corning, NY (US); Kevin Robert McCarthy, Horseheads, NY (US); Weijun Niu, Painted Post, NY (US); David Neal Schissel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/642,022

(22) Filed: Mar. 9, 2015

(65) Prior Publication Data
US 2015/0277031 A1    Oct. 1, 2015

Related U.S. Application Data

(60) Provisional application No. 61/973,311, filed on Apr. 1, 2014.

(51) Int. Cl.
*G02B 6/04* (2006.01)
*G02B 6/02* (2006.01)
*C03C 25/10* (2006.01)
*C03C 25/28* (2006.01)
*C03C 25/32* (2006.01)

(52) U.S. Cl.
CPC ....... *G02B 6/02033* (2013.01); *C03C 25/1065* (2013.01); *C03C 25/285* (2013.01); *C03C 25/326* (2013.01); *G02B 6/02223* (2013.01); *G02B 6/02395* (2013.01)

(58) Field of Classification Search
CPC ...................................... G02B 1/048
See application file for complete search history.

(56) References Cited

U.S. PATENT DOCUMENTS

| | | | |
|---|---|---|---|
| 6,810,187 B2 | 10/2004 | Fabian et al. | |
| 8,093,322 B2 | 1/2012 | Hancock et al. | |
| 9,046,670 B2 * | 6/2015 | White | G02B 6/4403 |
| 2007/0100039 A1 | 5/2007 | Hancock et al. | |
| 2009/0280329 A1 | 11/2009 | Rukavina et al. | |

(Continued)

FOREIGN PATENT DOCUMENTS

| | | |
|---|---|---|
| JP | 62146966 | 6/1987 |
| WO | 2005090488 | 9/2005 |

(Continued)

OTHER PUBLICATIONS

International Search Report, issued in connection with corresponding PCT application No. PCT/US2015/023002, Dec. 14, 2015.

*Primary Examiner* — Rhonda Peace
(74) *Attorney, Agent, or Firm* — Kevin L. Bray

(57) ABSTRACT

An optical fiber is disclosed that includes a primary coating formed from a radiation curable composition that includes a curable cross-linker essentially free of urethane and urea functional groups, a curable diluent, and a non-radiation curable component comprising (thio)urethane and/or (thio) urea groups. The primary coating features low Young's modulus, low $T_g$, and high tensile strength. The optical fiber exhibits low microbend losses in wire mesh drum and basketweave tests.

20 Claims, 4 Drawing Sheets

(56) References Cited

U.S. PATENT DOCUMENTS

| | | | | |
|---|---|---|---|---|
| 2013/0243948 A1* | 9/2013 | Baker | ............... | C03C 25/1065 427/162 |
| 2013/0302003 A1* | 11/2013 | Bookbinder | ......... | G02B 6/4403 385/128 |
| 2014/0341519 A1* | 11/2014 | White | ............... | G02B 6/4403 385/114 |
| 2015/0247985 A1* | 9/2015 | White | ............... | G02B 6/4403 385/114 |
| 2015/0277031 A1* | 10/2015 | Bookbinder | ....... | G02B 6/02033 385/115 |

FOREIGN PATENT DOCUMENTS

| | | |
|---|---|---|
| WO | 2013138155 | 9/2013 |
| WO | 2013169840 | 11/2013 |

* cited by examiner

PRIMARY OPTICAL FIBER COATING COMPOSITION CONTAINING NON-RADIATION CURABLE COMPONENT

This application claims the benefit of priority under 35 U.S.C. §119 of U.S. Provisional Application Ser. No. 61/973,311 filed on Apr. 1, 2014 the content of which is relied upon and incorporated herein by reference in its entirety.

FIELD

The present application relates to a primary optical fiber coating composition and novel components thereof, radiation cured coatings formed from composition, coated optical fibers encapsulated by the cured coating, and methods of making the same.

BACKGROUND

The light transmitting performance of an optical fiber is highly dependent upon the properties of the polymer coating that is applied to the fiber during manufacturing. Typically a dual-layer coating system is used where a soft inner-primary coating is in contact with the glass fiber and a harder, outer-primary or secondary coating surrounds the inner-primary coating. The hard coating allows the fiber to be handled and further processed, while the soft coating plays a key role in dissipating external forces and preventing them from being transferred to the fiber where they can cause microbend induced light attenuation.

The functional requirements of the inner-primary coating place various requirements on the materials that are used for these coatings. The Young's modulus of the inner-primary coating is generally less than 1 MPa, and is ideally less than 0.5 MPa. The glass transition temperature of the inner-primary coating is less than 5° C., and is ideally about −20° C. or less to ensure that the coating remains soft when the fiber is subjected to low temperatures. In order to ensure uniform deposition on the fiber, the coating is applied to the fiber in liquid form and must quickly form a solid having sufficient integrity to support application of the outer-primary coating. Also, the tensile strength of the coating, which generally decreases as the modulus decreases, must be high enough to prevent tearing defects during draw processing or subsequent processing of the coated fiber during cabling, etc.

To meet these requirements, optical fiber coatings have traditionally been formulated as mixtures of radiation curable urethane/acrylate oligomers and radiation curable acrylate functional diluents. Upon exposure to light and in the presence of a photoinitiator, the acrylate groups rapidly polymerize to form a crosslinked polymer network which is further strengthened by the hydrogen bonding interactions between urethane groups along the oligomer backbone. By varying the urethane/acrylate oligomer, it is possible to form coatings having very low modulus values while still having sufficient tensile strength. Numerous optical fiber coating formulations have already been disclosed in which the composition of the radiation curable urethane/acrylate oligomer has been varied to achieve different property targets.

Despite the ability to generate coatings that adequately protect the underlying optical fiber and produce low signal loss (attenuation), there continues to be a need to further improve the properties of optical fibers and their coatings. The present description is directed to overcoming these and other deficiencies in the art.

SUMMARY

A first aspect of the exemplary embodiments relates to a radiation curable composition that includes a curable cross-linker essentially free of urethane and urea functional groups; a curable diluent; and a non-radiation curable component comprising (thio)urethane and/or (thio)urea groups.

A second aspect of the exemplary embodiments relates to a coated optical fiber that includes an optical fiber and a primary coating that surrounds the optical fiber, wherein the primary coating is the cured product of the composition according to the first aspect of the exemplary embodiments.

A third aspect of the exemplary embodiments relates to an optical fiber ribbon or bundle that includes a plurality of substantially aligned optical fibers according to the second aspect of the exemplary embodiments and a matrix encapsulating the plurality of optical fibers.

A fourth aspect of the exemplary embodiments relates to a method of manufacturing an optical fiber according to the second aspect of the exemplary embodiments. The method includes applying a composition according to the first aspect of the exemplary embodiments to an optical fiber, and exposing the composition to radiation that is effective to cure the composition and thereby form a primary coating that surrounds the optical fiber.

A fifth aspect of the exemplary embodiments relates to a non-radiation curable component comprising (thio)urethane and/or (thio)urea groups that is useful in preparing the coating composition according to the first aspect of the exemplary embodiments.

According to one embodiment, the non-radiation curable component comprises a core moiety covalently linked to two or more block moieties that comprise the (thio)urethane and/or (thio)urea groups, and terminate in a non-radiation curable capping agent. Each of the block moieties contains one or more soft blocks and optionally one or more hard blocks, wherein the average weight ratio of the soft blocks to hard blocks is at least 3:1. The soft blocks are the reaction products of a di(thio)isocyanate and a polyol or amine-capped polyol, whereas the hard blocks are the reaction products of a di(thio)isocyanate and a diol or diamine comprising a hydrocarbon or oxygen-containing hydrocarbon having an average molecular weight of between about 28 to about 400.

The accompanying Examples demonstrate the preparation and use of low modulus primary fiber coatings in which low strength polymer networks are prepared based on polyol diacrylates modified by non-reactive branched urethane components, or NRBUs. The non-reactive urethane-containing "arms" or branches of the components are of high molecular weight and are designed to become entangled within the acrylic network as it is formed, creating physical interactions (but not covalent bonds) with the cross-linked network to enhance the otherwise poor tensile strength of the acrylic network. The results demonstrate the generation of several coating compositions having a Young's modulus of less than about 1.0 MPa, a tensile strength of at least about 0.4 MPa, more preferably at least about 0.5 MPa, an elongation at break of at least about 70%, and a $T_g$ that is less than −10° C. With these properties, it is believed that optical fibers possessing these primary coatings will exhibit improved (i.e., lower) attenuation losses.

DETAILED DESCRIPTION OF THE EXEMPLARY EMBODIMENTS

The present description relates to optical fiber primary coating compositions, coated optical fibers encapsulated by the primary coating, and methods of making the same.

In the description that follows, various components of coating compositions will be discussed and the amounts of particular components in the coating composition will be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and may be referred to herein as a base composition or base coating composition. Any cross-linker component(s), diluent component(s), non-radiation-curable component(s), and polymerization initiator(s) present in a coating composition are base components and are collectively regarded as the base composition. The base composition minimally includes a radiation-curable component, a non-radiation-curable component, and a polymerization initiator. The radiation-curable component may be a radiation-curable cross-linker or a radiation-curable diluent. The base composition may, however, include one or more radiation-curable cross-linker components, one or more radiation-curable diluent components, one or more non-radiation-curable components, and one or more polymerization initiators. The collective amount of base components in a coating composition is regarded herein as equaling 100 weight percent.

Additives are optional and may include one or more of an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive will be expressed herein as 1 pph.

Figure 1:
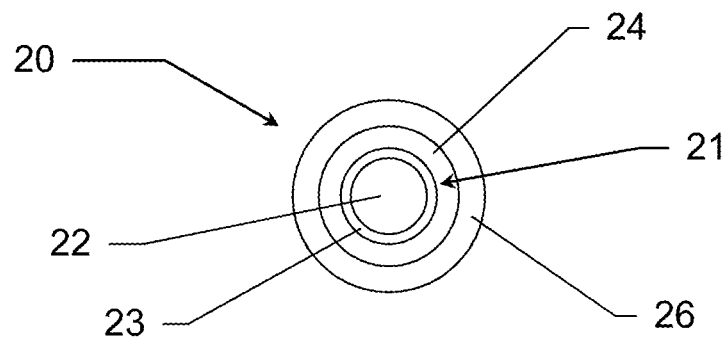
FIG. 1 is a schematic view of a coated optical fiber according one embodiment.

One embodiment relates to a coated optical fiber. An example of a coated optical fiber is shown in schematic cross-sectional view in FIG. 1. Coated optical fiber 20 includes a glass optical fiber 21 surrounded by primary coating 24 and secondary coating 26. The primary coating 24 is the cured product of a coating composition in accordance with the present description.

The glass fiber 21 is an uncoated optical fiber including a core 22 and a cladding 23, as is familiar to the skilled artisan. In many applications, the core and cladding layer have a discernable core-cladding boundary. Alternatively, the core and cladding layer can lack a distinct boundary. One such fiber is a step-index fiber. Exemplary step-index fibers are described in U.S. Pat. Nos. 4,300,930 and 4,402,570 to Chang, each of which is hereby incorporated by reference in its entirety. Another such fiber is a graded-index fiber, which has a core whose refractive index varies with distance from the fiber center. A graded-index fiber is formed basically by diffusing the glass core and cladding layer into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., each of which is hereby incorporated by reference in its entirety.

The optical fiber may also be single or multi-moded at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.). Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 24 desirably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25-40 μm (e.g. about 32.5 μm). Primary coatings are typically applied to the glass fiber as a liquid and cured, as will be described in more detail herein below.

The present primary coatings may be the cured product of a curable cross-linker that is essentially free of urethane and urea functional groups, a curable diluent, a non-radiation curable component comprising (thio)urethane and/or (thio)urea groups, and a polymerization initiator.

As used herein, the term "curable" is intended to mean that the component includes one or more functional groups capable of forming covalent bonds that participate in linking the components to form the polymeric coating material (i.e., the cured product). Cross-linking of the cross-linker or diluent occurs when the curable cross-linker or diluent includes two or more functional groups, each of which is capable of forming covalent bonds that participate in linking the components to form the polymeric coating material. Examples of these functional groups that participate in covalent bond formation are identified hereinafter. In contrast, as used herein, the terms "non-curable" and "non-radiation curable" are intended to mean that the component is lacking in functional groups capable of forming covalent bonds during the initial curing process.

Figure 3:
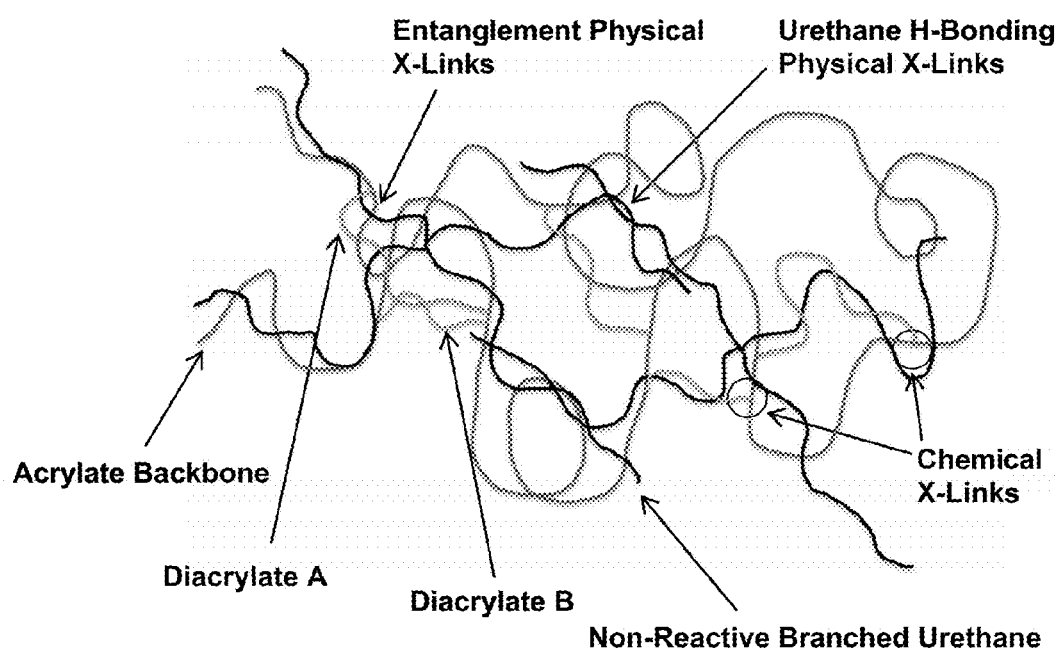
FIG. 3 is a schematic illustration of an embodiment of a primary coating, which is a lightly covalently crosslinked acrylate coating reinforced by the physical mechanisms (e.g., H-bonding) provided by non-reactive components, preferably non-reactive branched urethane or urea components.

The curable cross-linker is a radiation curable component of the primary coating composition, and as such it includes one or more functional groups capable of participating in the covalent bonding or cross-linking of the cross-linker into the polymeric coating (see FIG. 3). Exemplary functional groups capable of participating in the cross-linking include α,β-unsaturated ester, amide, imide or vinyl ether groups.

As noted above, the curable cross-linker is essentially free of urethane or urea groups. The curable cross-linker may also be essentially free of thiourethane or thiourea groups. By "essentially free" it is preferable that less than 1 weight percent of the curable cross-linker component includes (thio)urethane or (thio)urea groups. In preferred embodiments, less than 0.5 weight percent of the total curable cross-linker component includes (thio)urethane or (thio)urea groups. In most preferred embodiments, the curable cross-linker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio)components. The present embodiments extend to coating compositions that include (thio)components with sulfur atom(s) or without sulfur atom(s) in the (thio)functional group as well as compositions that include some (thio)components with sulfur atom(s) and some (thio)components without sulfur atom(s).

In certain embodiments, the curable cross-linker component includes one or more polyols that contain two or more α,β-unsaturated ester, amide, imide, or vinyl ether groups, or combinations thereof. Exemplary classes of these polyol cross-linkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable cross-linker can be a polyether polyol, a polyester polyol, a polycarbonate polyol, or a hydrocarbon polyol.

The curable cross-linker component preferably has a molecular weight of between about 250 and about 15000 daltons, in some embodiments more preferably between about 300 and about 9000 daltons, in some embodiments preferably between about 1500 and about 5000 daltons, in other embodiments preferably between about 300 and about 1000 daltons.

The curable cross-linker component is present in the radiation curable composition in an amount of about 4 to about 60 percent by weight, more preferably about 4 to about 50 percent by weight, most preferably about 4 to about 40 percent by weight.

The curable diluent is a generally lower molecular weight (i.e., about 120 to 600 daltons) liquid monomer that is added to the formulation to provide the liquidity needed to apply the coating composition with conventional liquid coating equipment. The curable diluent contains at least one functional group that allows the diluent, upon activation, to link to the polymer with the curable cross-linker components (see FIG. 3). These functional groups include, without limitation, acrylate, methacrylate, maleate, fumarate, maleimide, vinyl ether, and acrylamide groups.

Monofunctional diluents will contain only a single reactive functional group, whereas polyfunctional diluents will contain two or more reactive functional groups. Whereas the former can link to the polymer network during curing, the latter can form cross-links within the polymer network.

When it is desirable to utilize moisture-resistant components, the diluent component will be selected on the basis of its compatibility with the selected moisture-resistant cross-linker(s) or component(s). Not all such liquid monomers may be successfully blended and copolymerized with the moisture-resistant cross-linker(s) or component(s) because such cross-linker(s) or component(s) are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomers include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl)isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3, 7-dimethyloctyl acrylate; alkoxyalkyl acrylates such as butoxyethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The curable diluent is typically present in the coating composition in amounts of about 10 to about 60 percent by weight, more preferably between about 20 to about 50 percent by weight, and most preferably between about 25 to about 45 percent by weight. The curable diluent can include a single diluent component, or combinations of two or more diluent components.

The non-radiation curable component is a relatively high-molecular weight component that includes (thio)urethane and/or (thio)urea groups that, although incapable of covalently binding the component to the cured product, participate in hydrogen bond interactions (or physical links) between the non-radiation curable component and other components of the cured polymer product (see FIG. 3). In one embodiment, the non-radiation curable component is a non-reactive branched (thio)urethane or (thio)urea component and may be referred to herein as a NRBU or NRBU component. The NRBU component lacks radiation curable groups, but includes (thio)urethane and/or (thio)urea groups.

The non-radiation curable component may contain a core moiety covalently linked to two or more block moieties that comprise (thio)urethane and/or (thio)urea groups, and terminate in a non-radiation curable capping agent. The capping agent may also be referred to herein as a capping moiety or capping group. The block moieties may also be referred to herein as branches. Each of the block moieties contains one or more soft blocks and optionally one or more hard blocks, wherein the average weight ratio of the soft blocks to hard blocks is at least 3:1. The soft blocks are the reaction products of a di(thio)isocyanate and a polyol or amine-capped polyol, whereas the hard blocks are the reaction products of a di(thio)isocyanate and a diol or diamine comprising a hydrocarbon or oxygen-containing hydrocarbon having an average molecular weight of between about 28 to about 400 g/mol.

The core moiety may be covalently linked to two block moieties, in which case the non-radiation curable component may have a linear structure as illustrated below:

The core moiety may be covalently linked top block moieties, where p is a number greater than 2, in which case the non-radiation curable component is said to have a branched structure as illustrated below:

Within each of the block moieties, the number and orientation of the soft blocks and any hard blocks, if present, may not be controlled precisely. Therefore, in the structures shown below, it is intended that the structures represent an average structure of the non-radiation curable components. Individual molecules within a single formulation may differ in the number and location of the different soft and hard blocks within the component relative to the average structure.

By way of example only, suitable configurations of soft and hard blocks include, without limitation: -Soft-Soft-Hard-CAP, -Soft-Hard-Soft-CAP, and -Hard-Soft-Soft-CAP for block moieties containing three blocks and capped with a non-reactive capping moiety (CAP); -Soft-Soft-Soft-Hard-CAP, -Soft-Soft-Hard-Soft-CAP, -Soft-Hard-Soft-Soft-CAP, -Hard-Soft-Soft-Soft-CAP, -Hard-Soft-Hard-Soft-CAP, -Hard-Soft-Soft-Hard-CAP, -Soft-Hard-Soft-Hard-CAP for block moieties containing four blocks and capped with a non-reactive capping moiety (CAP); -Soft-Soft-Soft-Soft-Hard-CAP, -Soft-Soft-Soft-Hard-Soft-CAP, -Soft-Soft-Hard-Soft-Soft-CAP, -Soft-Hard-Soft-Soft-Soft-CAP, -Hard-Soft-Soft-Soft-Soft-CAP, -Soft-Soft-Hard-Soft-Hard-CAP, -Soft-Hard-Soft-Hard-Soft- CAP, -Soft-Hard-Soft-Soft-Hard-CAP, -Hard-Soft-Hard-Soft-Soft-CAP, -Hard-Soft-Soft-Hard-Soft-CAP, and -Hard-Soft-Soft-Soft-Hard-CAP for block moieties containing five blocks and capped with a non-reactive capping moiety (CAP); -Soft-Soft-Soft-Soft-Soft-Hard-CAP, -Soft-Soft-Soft-Soft-Hard-Soft-CAP, -Soft-Soft-Soft-Hard-Soft-Soft-CAP, -Soft-Soft-Hard-Soft-Soft-CAP, - Soft-Hard-Soft-Soft-Soft-Soft-CAP, -Hard-Soft-Soft-Soft-Soft-Soft-CAP, -Hard-Soft-Soft-Soft- Soft-Hard-CAP, -Hard-Soft-Soft-Soft-Hard-Soft-CAP, -Hard-Soft-Soft-Hard-Soft-Soft-Soft-CAP, -Hard-Soft-Hard-Soft-Soft-Soft-CAP, -Soft- Hard-Soft-Soft-Hard-Soft-CAP, -Soft-Hard-Soft-Soft-Hard-Soft-CAP, -Soft-Hard-Soft-Hard-Soft-Soft-CAP, -Soft-Soft-Hard-Soft-Soft-Hard-CAP, -Soft-Soft-Hard-Soft-Hard-Soft-CAP, and -Soft-Soft-Soft-Hard-Soft-Hard-CAP for block moieties containing six blocks and capped with a non-reactive capping moiety (CAP); etc.

In one embodiment, the non-radiation curable components have the average structure according to formulae (Ia) or (Ib) shown below:

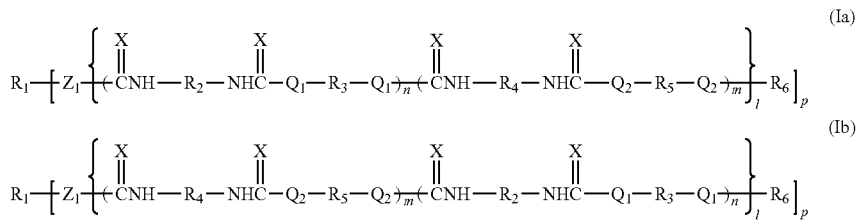

(Ia)

(Ib)

wherein, $R_1$ is a core moiety of a multifunctional reactant, where the number of functional groups of the core moiety is defined by p, where p is 2 or greater;
each X is independently S or O;
$Z_1$ is —O—, —S—, —N(H)—, or —N(alkyl)-, preferably —O— or —N(H)—;
each of $Q_1$ and $Q_2$ is independently —O—, —S—, —N(H)—, or —N(alkyl)-, preferably —O— or —N(H)—;
each of $R_2$ and $R_4$ is a core moiety of a di(thio)isocyanate reactant;
$R_3$ is a core moiety of a polyol or amine-capped polyol reactant;
$R_5$ is a hydrocarbon or oxygen-containing hydrocarbon having an average molecular weight of between about 28 to about 400;
$R_6$ is represented by the structure according to formula (II) or (III)

$$—CNH—R_7—NHC—Z_2—R_8 \quad \text{or}$$ (II)

$$—CNH—R_9$$ (III)

where X is defined as above, $Z_2$ is —O—, —S—, —N(H)—, or —N(alkyl)-, preferably —O— or —N(H)—, $R_7$ is a core moiety of a di(thio)isocyanate reactant, $R_8$ is a non-radiation curable capping agent, and $R_9$ is a core moiety of an isocyanate or thioisocyanate reactant;
l is 1 to 6;
m is greater than or equal to 0, preferably 1 to 4, more preferably 1 to 3; and
n is greater than or equal to 1, preferably 2 to 10, more preferably 2 to 6.

In the structures of formulae (Ia) and (Ib), the block moiety is the region within square brackets defined by variable p; a soft block is the region within round brackets defined by variable n or the moiety defined as formula (II); and the hard block is the region within round brackets defined by variable m.

The core moiety ($R_1$) present in the non-radiation curable component is the reaction product of a multifunctional core reactant. The functional groups can be hydroxyl groups or amino groups. Preferably, the multifunctional core reactant is a polyol or an amine-capped polyol. Examples of these core reactants and their number of functional groups (p) include, without limitation, glycerol, where p=3; trimethylol propane, where p=3; pentaerythritol, where p=4; ditrimethylol propane, where p=4; ethylenediamine tetrol, where p=4; xylitol, where p=5; dipentaerythritol, where p=6; sucrose and other disaccharides, where p=8; alkoxylated derivatives thereof; dendrimers where p is from about 8 to about 32, such as poly(amidoamine) (PAMAM) dendrimers with G1 (p=8), G2 (p=16), or G3 (p=32) amine groups or PAMAM-OH dendrimers with G1 (p=8), G2 (p=16), or G3 (p=32) hydroxyl groups; and combinations thereof.

$R_2$, $R_4$, and $R_7$ independently represent the core moiety of a di(thio)isocyanate reactant. This includes both diisocyanates and dithioisocyanates, although diisocyanates are preferred. Although any diisocyanates and dithioisocyanates can be used, preferred $R_2$, $R_4$, and $R_7$ core groups of these diisocyanates and dithioisocyanates include the following:

| Reactant Name | $R_2$ or $R_4$ or $R_7$ Core Moiety |
|---|---|
| 4,4'-methylene bis(cyclohexyl) diisocyanate (H12MDI) | |
| toluene diisocyanate (TDI) | |
| Isophorone diisocyanate (IPDI) | |
| Tetramethyl-1,3-xylylene diisocyanate (XDI) | |

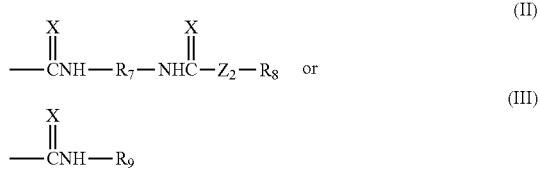

-continued

| Reactant Name | $R_2$ or $R_4$ or $R_7$ Core Moiety |
|---|---|
| 4,4'-methylene bis(phenyl) diisocyanate (MDI) | (structure: two phenyl rings connected by CH₂) |
| p-phenylene diisocyanate (PDI) | (structure: single phenyl ring) |
| Alkyl diisocyanates | —(CH₂)$_q$— where $q$ is 2 to 12, preferably 6 |

$R_3$ is a core moiety of a polyol or amine-capped polyol reactant that preferably has a number average molecular weight of greater than or equal to about 400. In certain embodiments, the polyol or amine-capped polyol has a number average molecular weight between about 1000 and about 9000, between about 2000 and 9000, or between about 4000 and 9000. Examples of suitable $R_3$-forming polyols include, without limitation, polyether polyols such as poly(propylene glycol)[PPG], poly(ethylene glycol)[PEG], poly(tetramethylene glycol) [PTMG] and poly(1,2-butylene glycol); polycarbonate polyols; polyester polyols; hydrocarbon polyols such as hydrogenated poly(butadiene) polyols; amine-capped derivatives of these polyols, and any combinations thereof.

$R_5$ is a hydrocarbon or oxygen-containing hydrocarbon, which is preferably saturated, and has an average molecular weight of between about 28 to about 400. Thus, $R_5$ is the core moiety of a low molecular weight diol (to form urethane linkages) or diamine (to form urea linkages) reactant that acts analogously to a chain extender in a polyurethane. Exemplary reactants include, without limitation, 1,4-butanediol, 1,6-butanediol, ethylene diamine, 1,4-butanediamine, and 1,6-hexanediamine. As noted above, these chain extender based urethane or urea groups are expected to result in "hard block" areas along the block moiety branch(es) that promote more effective hydrogen bonding branch interactions than would the simple urethane (or urea) linkages resulting from polyol (or amine capped polyol)/isocyanate links. Where m is 0, the hard block is not present.

$R_8$ is the reaction product of a non-radiation curable capping agent, which caps the reactive isocyanate group at the end of a block moiety branch. These agents are preferably monofunctional alcohols (or amines) that will react with residual isocyanate groups at the end of a branch. Examples of these reactants include, without limitation, 1-butanol, 1-octanol, poly(propylene glycol) monobutyl ether, and 2-butoxyethanol.

$R_9$ is a core moiety of an (thio)isocyanate reactant. Any suitable monofunctional (thio)isocyanate can be used for this purpose. Exemplary (thio)isocyanate reactants that can serve as non-reactive capping agent for an arm of the component include, without limitation, methyl isocyanate, ethyl isocyanate, n-propyl isocyanate, i-propyl isocyanate, n-butyl isocyanate, i-butyl isocyanate, n-pentyl isocyanate, n-hexyl isocyanate, n-undecylisocyanate, chloromethyl isocyanate, β-chloroethyl isocyanate, γ-chloropropyl isocyanate, ethoxycarbonylmethyl isocyanate, β-ethoxyethyl isocyanate, α-ethoxyethyl isocyanate, α-butoxyethyl isocyanate, α-phenoxyethylisocyanate, cyclopentyl isocyanate, cyclohexyl isocyanate, methyl isothiocyanate, and ethyl isothiocyanate.

In certain embodiments of the non-radiation curable components, each branch or block moiety preferably has a molecular weight of at least about 1000, preferably at least about 2000, more preferably at least about 3000. In certain embodiments, each branch has a molecular weight of about 3000 to about 15000 daltons, more preferably between about 3000 and about 12000 daltons. Consequently, the non-radiation curable component preferably has a molecular weight of between about 4000 and about 50000 daltons, more preferably between about 6000 and about 35000 daltons, even more preferably between about 8000 and about 25000 daltons. In one embodiment, the length and/or molecular weight of the branches are selected to promote physical entanglements of the non-radiation curable component with the cured network formed from the curable cross-linker and/or curable diluent. Larger branches are expected to participate in more or stronger physical interactions with the cured network and the stronger physical interactions are expected to impart strength to the cured coating. If the molecular weight of the branches or non-radiation curable component is too large, however, the non-radiation curable component may be difficult to process.

The degree of intra- and inter-component interactions through hydrogen bonding can be adjusted by varying the molecular weight of the polyol or amine-capped polyol used to form part of a branch or block moiety. For example, one could use a single soft block with a molecular weight of about 8000 or multiple (n) soft blocks having a lower molecular weight but collectively having about the same overall molecular weight. In this example, the latter soft block will have more urethane/urea linkages and would be expected to hydrogen bond more effectively. As noted above, these interactions can also be promoted by the inclusion of optional chain extender based hard blocks. The number of urethane/urea linkages and the numbers of soft and hard blocks can be adjusted through the number of n and m blocks as well as the n/m ratio. As will be appreciated by one of ordinary skill in the art, while these hydrogen bonding interactions demonstrate expected increases in cured coating integrity and performance, strong intra-component interactions also may in some circumstances limit the solubility of the component in a coating formulation or lead to physical gelation of an component during synthesis or after it has been mixed into a formulation but before radiation-induced curing has occurred.

The non-radiation curable component components can be prepared using standard reactions between isocyanate groups and hydroxyl groups (to form urethane linkages) or amine groups (to form urea linkages). By way of example, molar measures of the desired reactants can be mixed together in a reaction vessel, with stirring, and maintained at a suitable temperature of about 45 to about 80° C., preferably about 70° C., for a duration suitable to allow each step of the reaction to complete. Typically, 30 to 90 minutes is sufficient in this regard depending upon the reaction temperature. To facilitate handling of the components during synthesis, especially those with high viscosity, one or more of the radiation curable diluents used in the final formulation—such as one of those listed above—can be used as a non-reactive diluent during the component synthesis.

Figure 4:
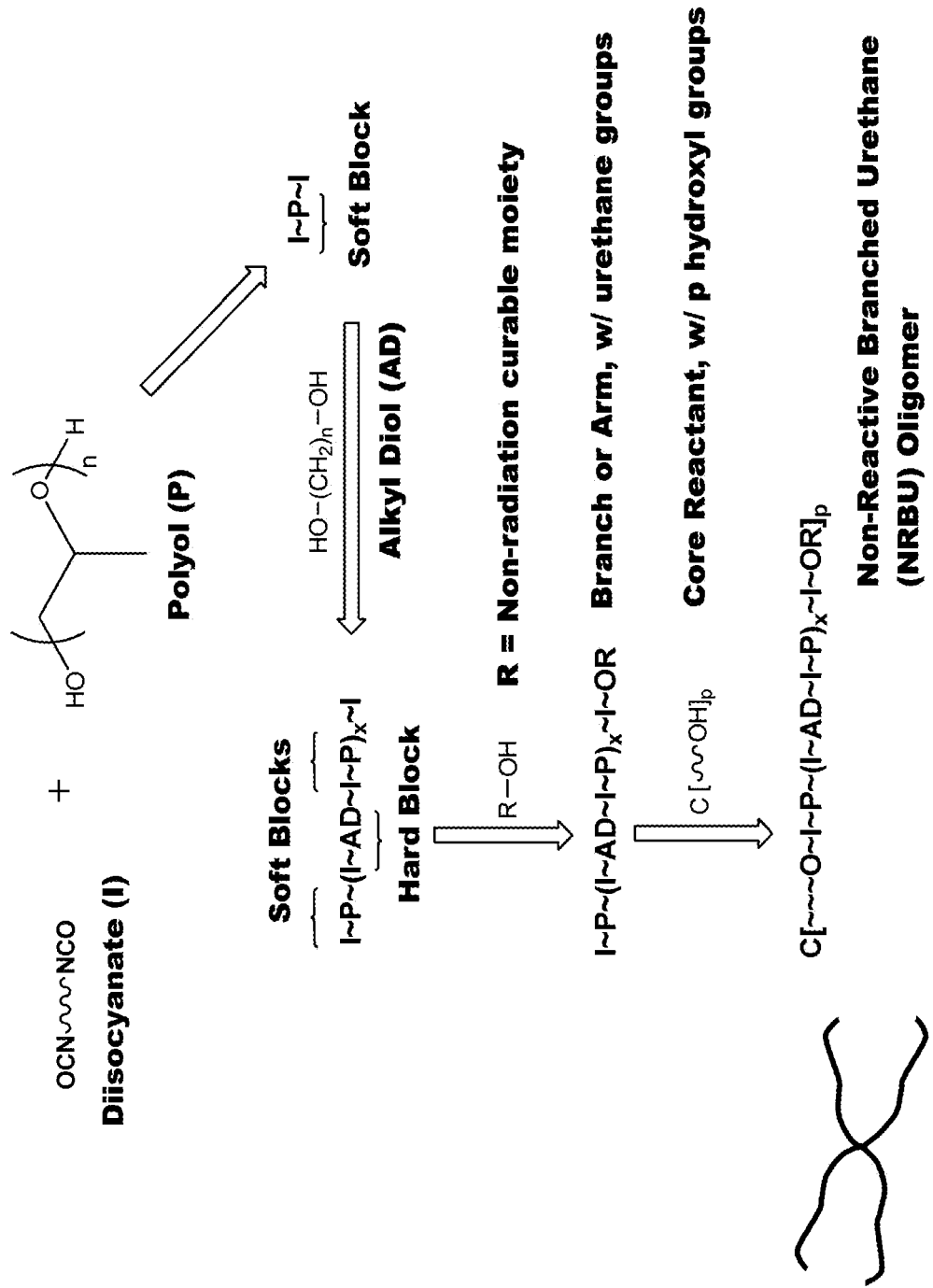
FIG. 4 illustrates one embodiment for forming non-reactive branched urethane/urea components using standard reactions between (thio)isocyanate groups and hydroxyl groups (to form (thio)urethane linkages) or amine groups (to form (thio)urea linkages).

Referring now to FIG. 4, in one embodiment the reaction proceeds by first forming the soft blocks using appropriate molar amounts of the polyol or amine-capped polyol reactant and diisocyanates described above, followed by the introduction of diol or diamine reactants to produce hard blocks, if desired, in an appropriate molar ratio, and finally by the introduction of end-capping reactants to complete each arm or branch of the final component. Once the arms have been prepared, the core moiety ($R_1$) multifunctional reactant is introduced in an appropriate molar ratio to form the linear or branched non-reactive component.

Exemplary non-radiation curable components include, without limitation, components having the average structures shown in Table 1 below (see Example 1, infra).

Once the component synthesis is complete, the non-radiation curable component can be used to formulate a coating composition in accordance with the present description. The non-radiation curable component is preferably present in the coating composition in an amount of about 10 to about 35 percent by weight, more preferably about 12 to about 28 percent by weight, most preferably about 15 to about 25 percent by weight.

In certain embodiments, the primary coating composition includes about 4 to about 60 percent by weight of the curable cross-linker, about 10 to about 60 percent by weight of the curable diluent, and about 10 to about 35 percent by weight of the non-radiation curable component.

In another embodiment, the primary coating composition includes about 4 to about 50 percent by weight of the curable cross-linker, about 4 to about 50 percent by weight of the curable diluent, and about 12 to about 35 percent by weight of the non-radiation curable component.

In another embodiment, the primary coating composition includes about 4 to 40 percent by weight of the curable cross-linker, about 25 to about 50 percent by weight of the curable diluent, and about 15 to about 35 percent by weight of the non-radiation curable component.

The base composition includes a polymerization initiator. The polymerization initiator is a reagent that is suitable to cause polymerization (i.e., curing) of the composition after its application to a glass fiber. Polymerization initiators suitable for use in the primary coating compositions include thermal initiators, chemical initiators, electron beam initiators, and photoinitiators. Photoinitiators are the preferred polymerization initiators. For most acrylate-based coating formulations, conventional photoinitiators, such as the known ketonic photoinitiators and/or phosphine oxide photoinitiators, are preferred. When used in the present coating compositions, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the coating composition. A desirable cure speed is any speed sufficient to cause substantial curing of the coating materials. As measured in a dose versus modulus curve, a cure speed for coating thicknesses of about 25-35 μm is, e.g., less than 1.0 J/cm$^2$, preferably less than 0.5 J/cm$^2$.

Suitable photoinitiators include, without limitation, 1-hydroxycyclohexylphenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucerin TPO available from BASF, Munich, Germany), ethoxy(2,4, 6-trimethylbenzoyl)phenyl phosphine oxide (e.g. Lucerin TPO-L from BASF), and combinations thereof.

In addition to the base components (curable cross-linker, curable diluent, non-radiation curable component, and polymerization initiator), the primary coating compositions may also include one or more additives. Representative additives include an adhesion promoter, an antioxidant, a catalyst, a carrier or surfactant, a tackifier, a stabilizer, and an optical brightener. Some additives (e.g., catalysts, reactive surfactants, and optical brighteners) may operate to control the polymerization process and may thereby affect the physical properties (e.g., modulus, glass transition temperature) of the cured product formed from the coating composition. Other additives may influence the integrity of the cured product of the coating composition (e.g., protect against de-polymerization or oxidative degradation).

As is well known in the art, an adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (e.g. Irganox 1035, available from BASF). The antioxidant, if present, is used in an amount between about 0.1 to about 3 pph, more preferably about 0.25 to about 2 pph.

An exemplary catalyst is a tin-catalyst, which is used to catalyze the formation of urethane bonds in some non-radiation curable components. Whether the catalyst remains as an additive of the non-radiation curable component or additional quantities of the catalyst are introduced into the composition, the presence of the catalyst can act to stabilize the non-radiation curable component(s) in the composition.

Suitable carriers, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 to about 5 pph, more preferably about 0.25 to about 3 pph. Other classes of suitable carriers are polyols and non-reactive surfactants. Examples of suitable polyols and non-reactive surfactants include, without limitation, the polyol Acclaim 3201 (poly (ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 to about 5 pph, most preferably about 0.1 to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-Tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez series of hydrocarbon tackifiers available from Exxon. For additional information regarding Escorez tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 to about 10 pph, more preferably in the amount between about 0.05 to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 to about 1 pph, more preferably about 0.01 to about 0.2 pph.

Any suitable optical brightener can be employed. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis (styryl)biphenyl compounds. The optical brightener is desirably present in the composition at a concentration of about 0.003 to about 0.5 pph, more preferably about 0.005 to about 0.3 pph.

A number of preferred primary coating compositions include compositions 4, 6, 7, 13, 14 (including 14A, B), and 15 as described in Example 2, infra.

The secondary or outer coating 26 is typically the polymerization product of a coating composition that contains urethane acrylate liquids whose molecules become highly cross-linked when polymerized. The Young's modulus of the secondary coating is reported herein for secondary coating compositions configured as cured rods according to the following description: Rods were prepared by injecting samples of the curable secondary composition into Teflon® tubing having an inner diameter of about 0.022". The samples were cured using a Fusion D bulb at a dose of about 2.4 J/cm$^2$ (measured over a wavelength range of 225-424 nm by a Light Bug model IL390 from International Light). After curing, the Teflon® tubing was stripped away. The cured rods were allowed to condition overnight at 23° C. and 50% relative humidity. After curing the rod diameter was about 0.022". Properties such as Young's modulus, tensile strength, and % elongation at break for the cured rods formed from the secondary composition were measured using a tensile testing instrument (e.g., a Sintech MTS Tensile Tester, or an Instron Universal Material Test System) on the cured secondary rod samples. The gauge length of the testing instrument was 51 mm, and the test speed was 250 mm/min. Properties were determined as an average of five samples, with outlying data points and obviously defective rod samples being excluded from the average.

The secondary coating 26 has a Young's modulus, when configured as a cured rod having a diameter of about 0.022" of at least about 1200 MPa, or at least about 1300 MPa, or at least about 1400 MPa, or at least about 1500 MPa, or at least about 1600 MPa, or at least about 1700 MPa, or at least about 1800 MPa. The cured polymeric material of secondary coating 26, when configured as a cured rod having a diameter of about 0.022", has an elongation to break of at least about 30%, preferably at least about 40%. The cured polymeric material of secondary coating 26, when configured as a cured rod having a diameter of about 0.022", has an average tensile strength of at least about 45 MPa, more preferably at least about 50 or 55 MPa, most preferably at least about 60 MPa. The $T_g$ of the secondary coating, when configured as a cured rod having a diameter of about 0.022", is preferably between about 50° C. and about 120° C., more preferably between about 50° C. and about 100° C. The secondary coating 26 typically has a thickness of about 20 to about 35 μm, preferably about 25 to about 27 μm.

Other suitable materials for use in secondary coatings, as well as considerations related to selection of these materials, are well known in the art and are described in U.S. Pat. Nos. 4,962,992 and 5,104,433 to Chapin, each of which is hereby incorporated by reference in its entirety.

The secondary coatings are typically applied to the previously coated fiber (either with or without prior curing) and subsequently cured, as will be described in more detail herein below. Various additives that enhance one or more properties of the coating can also be present, including antioxidants, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Another aspect of the exemplary embodiments relates to a method of making an optical fiber including the primary coating described hereinabove. This method can generally be performed by standard methods with the use of a composition in accordance with the present description. Briefly, the process involves fabricating the glass fiber (using methods familiar to the skilled artisan), applying a primary coating composition to the glass fiber, polymerizing the primary coating composition to form the primary coating material, applying the curable composition described hereinabove to the coated glass fiber, and polymerizing the curable composition to form the cured polymeric material as the secondary coating of the optical fiber. This is known as a "wet-on-dry" process. Optionally, the secondary coating composition can be applied to the coated fiber before polymerizing the primary coating composition, in which case only a single polymerization step is employed. This is known as a "wet-on-wet" process.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety.

Figure 2:
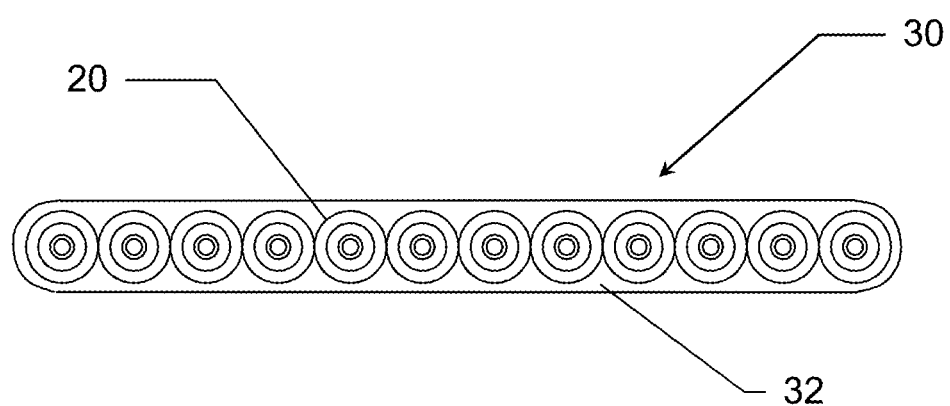
FIG. 2 is a schematic view of an optical fiber ribbon according to one embodiment. Although the ribbon shown includes twelve coated optical fibers, it should be appreciated by skilled artisans that any number of optical fibers may be included in the ribbon.

Referring now to FIG. 2, another aspect of the exemplary embodiments relates to an optical fiber ribbon 30. The ribbon 30 includes a plurality of optical fibers 20 and a matrix 32 encapsulating the plurality of optical fibers. The optical fibers 20 are substantially aligned relative to one another in a substantially planar relationship. It is desirable that optical fibers 20 are not displaced from a common plane by a distance of more than about one-half the diameter thereof. By "substantially aligned", it is intended that the optical fibers 20 are generally parallel with other optical fibers along the length of the fiber optic ribbon 30. The optical fibers in fiber optic ribbons may be encapsulated by the matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use.

The matrix can be any suitable secondary coating composition as described above. The matrix can be formed from the same composition used to prepare the secondary coating 26, or the matrix can be formed from a different composition that is otherwise compatible for use. The skilled artisan will appreciate that the optical fibers 20 may include a dual-layer coating system (for example, the primary and secondary coatings described hereinabove), and may be colored with a marking ink.

The fiber optic ribbon may be prepared by conventional methods using an optical fiber containing a primary coating of the type described herein. For example, upon alignment of a plurality of substantially planar optical fibers having primary coatings in accordance with the exemplary embodiments described herein, the matrix composition can be applied and cured according to the methods of preparing optical fiber ribbons as described in U.S. Pat. No. 4,752,112 to Mayr and U.S. Pat. No. 5,486,378 to Oestreich et al., which are hereby incorporated by reference in their entirety.

EXAMPLES

The following Examples are intended to illustrate exemplary embodiments and are not intended to be limiting.

Synthesis of NRBU (Non-Reactive Branched Urethane) and NRLU (Non-Reactive Linear Urethane) Components In the following synthesis schemes, poly(propylene glycol), dibutyltin dilaurate, 2,6-di-tert-butyl-4-methylphenol (BHT), 4,4'-methylenebis(cyclohexyl-isocyanate) (H12MDI), isophorone diisocyanate (IPDI), 1,4-butanediol, 2-butoxyethanol, propoxylated pentaerythritol (PO/OH ~17/8), Tetronic 701 and poly(propylene glycol) 900 diacrylate (PPGDA900) were purchased from Aldrich Chemical Co. Tetronic 701 is an ethylenediamine tetrakis(propoxylate-block-ethoxylate)tetrol having a number average molecular weight of ~3600. Photomer 4003 (ethoxylated(4)nonylphenol acrylate) and isobornyl acrylate (IBOA) are available from IGM Resins. SR495, caprolactone acrylate, was from Sartomer. P1200, P2000, and P4000 are polypropylene glycol having number average molecular weights ($M_n$), respectively, of about 1200 g/mol, 2000 g/mol and 4000 g/mol and are available from Aldrich. Lucerin TPO is available from BASF. BR3741 is HEA~(H12MDI~P4000)$_2$~H12MDI~HEA, where HEA is hydroxyethyl acrylate. All materials were used as received.

Poly(propylene glycol) 2000 diacrylate (PPG2000DA) was prepared by using the process reported by Malucelli et al., "Synthesis of Poly(propylene-glycol-diacrylates) and Properties of the Photocured Networks," *J. Appl. Polymer Sci.* 65(3): 491-497 (1997), which is hereby incorporated by reference in its entirety.

Table 1 below illustrates average structures for NRBU and NRLU components synthesized in accordance with the procedures described herein. In general, synthesis followed the exemplary protocol illustrated in FIG. 4, whereby a diisocyanate was first reacted with a polyol (e.g., polypropylene glycol) to form a soft block reactant (designated I~P~I in FIG. 4). The use of the polyol and diisocyanate forms urethane groups within the soft block reactant; however, if an amine-capped polyol was instead used, then urea groups would be formed within the soft block reactant. Next, the soft block reactant (I~P~I) was reacted with a saturated hydrocarbon diol (e.g., 1,4-butanediol or BD) to form a hard block moiety sandwiched between two soft block moieties. The average structure of the thus-formed component is designated as I~P~(I~BD~I~P)$_x$~I in FIG. 4. The average length of the component, and the number of hard block moieties present in the component, can be controlled by adjusting the molar ratios of these reactants. The component reactant is then reacted with 2-butoxyethanol, a capping reagent that includes a single hydroxyl group capable of reacting with an isocyanate group present in the intermediate component designated as I~P~(I~BD~I~P)$_x$~I in FIG. 4. This effectively caps one end of the component with an unreactive capping moiety (e.g., butoxyethoxy), forming the final intermediate designated as I~P~(I~BD~I~P)$_x$~I~OR in FIG. 4. These end-capped final intermediates represent the arms of the end-product component to be formed. The final intermediate is then reacted with a multifunctional core reagent containing 2 or more functional groups, illustrated as the tetrol C[~OH]$_4$ (p=4) in FIG. 4, resulting in an component containing two or more block moieties (i.e., the arms) (four shown in FIG. 4) that contain (thio)urethane and/or (thio)urea groups, and terminate in a non-radiation curable capping agent. Each of the block moieties (or "arms") comprises one or more soft blocks and optionally one or more hard blocks, wherein the average weight ratio of the soft blocks to hard blocks is at least 3:1.

TABLE 1

Average Structures For NRBU or NRLU Components

| Name | Average Molecular Structure |
|---|---|
| NRBU1 | C[CH2(PO)$_2$~IPDI~P1200~IPDI~BD~IPDI~P1200~IPDI~O(CH2)$_2$OBu]$_4$ |
| NRBU2 | C[CH2(PO)$_2$~H12MDI~P1200~H12MDI~BD~H12MDI~P1200~H12MDI~O(CH2)$_2$OBu]$_4$ |
| NRLU3 | BuO(CH2)$_2$O~(H12MDI~P4000)$_2$~H12MDI~O(CH2)$_2$OBu |
| NRBU4 | Tetronic 701[IPDI~P1200~IPDI~BD~IPDI~P1200~IPDI~O(CH2)2OBu]$_4$ |
| NRBU5 | Tetronic 701[H12MDI~P1200~H12MDI~BD~H12MDI~P1200~H12MDI~O(CH2)2OBu]$_4$ |
| NRBU6 | C[CH2(PO)$_2$~IPDI~P4000~IPDI~BD~IPDI~P4000~IPDI~O(CH2)$_2$OBu]$_4$ |

Preparation of Non-Reactive Branched Urethane Component 1 (NRBU1):

To a mixture of 198.1 g (0.89 mol) IPDI, 418 g Photomer 4003, 1.6 g 2,6-di-t-butyl-4-methylphenol and 0.5 g dibutyltin dilaurate was added dropwise 552.5 g (0.442 mol) of poly(propylene glycol) having an $M_n$ of 1250 from the reported hydroxyl number of 89.6. The reaction temperature was kept below 50° C. during the addition. When the addition was complete, residue in the addition funnel was flushed into the reactor with 25 g of Photomer 4003. The mixture was heated at approximately 70° C. for 1 h. Then 20.1 g (0.223 mol) of 1,4-butanediol was added, followed by 25 g of Photomer 4003 to flush the addition funnel. The mixture was heated at approximately 70° C. for 1 h. Then 26.3 g (0.223 mol) of 2-butoxyethanol was added, followed by 25 g of Photomer 4003 to flush the addition funnel. The mixture was heated at approximately 70° C. for 1 h. Then 35.1 g (0.056 mol) of propoxylated pentaerythritol with molecular weight 629 was added, followed by 25 g of Photomer 4003 to flush the addition funnel. The mixture was heated at approximately 70° C. for 1 h, at which point the formation of the component was complete. Approximately 1324 g of component (98% mass recovery) was isolated.

Preparation of Non-Reactive Branched Urethane Component 2 (NRBU2):

To a mixture of 207.3 g H12MDI, 400 g Photomer 4003, 1.6 g 2,6-di-t-butyl-4-methylphenol and 0.5 g dibutyltin dilaurate was added dropwise over approximately one hour 471 g of poly(propylene glycol) having an $M_n$ of 1200. The reaction temperature was kept below 50° C. during the addition. When the addition was complete, residue in the addition funnel was flushed into the reactor with 25 g of Photomer 4003. The mixture was heated at approximately 70° C. for 1 h. Over 10 minutes, 17.75 g of 1,4-butanediol was added, followed by 25 g of Photomer 4003 to flush the addition funnel. The mixture was heated at approximately 70° C. for 1 h. Over 10 minutes, 23.3 g of 2-butoxyethanol was added, followed by 25 g of Photomer 4003 to flush the addition funnel. The mixture was heated at approximately 70° C. for 1 h. Over 10 minutes, 31 g of propoxylated pentaerythritol with molecular weight 629 was added, followed by 25 g of Photomer 4003 to flush the addition funnel. The mixture was heated at approximately 70° C. for 1 h, at which point the formation of the component was complete. Approximately 1197 g of component (96% mass recovery) was isolated.

Preparation of Non-Reactive Linear Urethane Component 3 (NRLU3):

To a mixture of 150 g (0.0375 mol) of poly(propylene glycol) having an $M_n$ of 4000, 250 mg 2,6-di-t-butyl-4-methylphenol and 250 mg dibutyltin dilaurate was added dropwise over approximately 20 min 14.76 g (0.0563 mol) H12MDI. The reaction temperature was kept below 50° C. during the addition. The mixture was heated at approximately 70° C. for 3 h. Then 4.42 g (0.0375 mol) of 2-butoxyethanol was added over about 2 min. The mixture was heated at approximately 70° C. for 1 h, at which point the formation of the component was complete.

Preparation of Non-Reactive Branched Urethane Component 4 (NRBU4):

To a mixture of 26.7 g (0.12 mol) IPDI, 50 g Photomer 4003, 150 mg 2,6-di-t-butyl-4-methylphenol and 150 mg dibutyltin dilaurate was added dropwise 71.5 g (0.06 mol) of poly(propylene glycol) having an $M_n$ of 1200. The reaction temperature was kept below 50° C. during the addition. The mixture was heated at approximately 70° C. for 1 h. Then 2.70 g of 1,4-butanediol was added, followed by 5 g of Photomer 4003 to flush the addition funnel. The mixture was heated at approximately 70° C. for 1 h. Then 3.54 g of 2-butoxyethanol was added, followed by 5 g of Photomer 4003 to flush the addition funnel. The mixture was heated at approximately 70° C. for 1 h. Then a mixture of 27 g (0.0075) of Tetronic 701 with a molecular weight of 3600 and 28 g of Photomer 4003 that had been pre-heated to 65° C. was added. The mixture was heated at approximately 70° C. for 1 h, at which point the formation of the component was complete.

Preparation of Non-Reactive Branched Urethane Component 5 (NRBU5):

To a mixture of 31.5 g (0.12 mol) H12MDI, 50 g Photomer 4003, 150 mg 2,6-di-t-butyl-4-methylphenol and 150 mg dibutyltin dilaurate was added dropwise 71.5 g (0.06 mol) of poly(propylene glycol) having an $M_n$ of 1200. The reaction temperature was kept below 50° C. during the addition. The mixture was heated at approximately 70° C. for 1 h. Then 2.70 g of 1,4-butanediol was added, followed by 5 g of Photomer 4003 to flush the addition funnel. The mixture was heated at approximately 70° C. for 1 h. Then 3.54 g of 2-butoxyethanol was added, followed by 5 g of Photomer 4003 to flush the addition funnel. The mixture was heated at approximately 70° C. for 1 h. Then a mixture of 27 g (0.0075 mol) of Tetronic 701 with a molecular weight of 3600 and 31 g of Photomer 4003 that had been pre-heated to 65° C. was added. The mixture was heated at approximately 70° C. for 1 h, at which point the formation of the component was complete.

Preparation of Non-Reactive Branched Urethane Component 6 (NRBU6):

To a mixture of 16.7 g (0.075 mol) IPDI, 76 g Photomer 4003, 150 mg 2,6-di-t-butyl-4-methylphenol and 150 mg dibutyltin dilaurate was added dropwise 150 g (0.0375 mol) of poly(propylene glycol) having an $M_n$ of 4000. The reaction temperature was kept below 50° C. during the addition. The mixture was heated at approximately 70° C. for 1 h. Then 1.69 g (0.01875 mol) of 1,4-butanediol was added, followed by 10 g of Photomer 4003 to flush the addition funnel. The mixture was heated at approximately 70° C. for 1 h. Then 2.21 g (0.01875 mol) of 2-butoxyethanol was added, followed by 10 g of Photomer 4003 to flush the addition funnel. The mixture was heated at approximately 70° C. for 1 h. Then 2.95 g (0.0047 mol) of propoxylated pentaerythritol with molecular weight 629 was added, followed by 10 g of Photomer 4003 to flush the addition funnel. The mixture was heated at approximately 70° C. for 1 h, at which point the formation of the component was complete.

The calculated and measured molecular weight of the components is presented in Table 2 below. The measured molecular weight is relative to polystyrene standards.

It should be emphasized that the structures given for the individual components represent ideal structures based upon the stoichiometric relationship of the components used in the synthesis of the material (see, e.g., Santhana et al., *Macromol. Sci. Rev. Macromol. Chem. Phys.*, C33(2):47-180 (1993); McConnell et al., *ACS Symp. Ser.* 417:272-283 (1990); Noren et al., *ACS Symp. Ser.* 417:258-271 (1990); Martin, *Radiation Curing* (August 1986), pp. 4-15; Miller, *Radiation Curing* (May 1984), pp. 4-7, each of which is hereby incorporated by reference in its entirety). Because it is difficult to control the reactivity of the diisocyanate and polyol (or diol) reactants, in most cases both higher and lower molecular weight components (containing a greater or smaller number of polyol or diol component blocks) will be present in any component mixture. In addition, many of the polyol reactants themselves are component materials with molecular weight values clustered around an average value. In addition to the measured molecular weights from GPC measurements, calculated molecular weight values based on the idealized structures are also given in the table for the various components and component branches.

TABLE 2

NRBU and NRLU Molecular Weight Characterization

| Component | $M_n$ (Calc.) | $M_w$ GPC | $M_n$/Branch (Calc.) |
|---|---|---|---|
| NRBU1 | 14600 | $M_n$ = 6600<br>$M_w$ = 9700<br>$M_w/M_n$ = 1.47 | 3600 |
| NRBU2 | 15300 | $M_n$ = 8500<br>$M_w$ = 12300<br>$M_w/M_n$ = 1.45 | 3800 |
| NRLU3 | 9020 | $M_n$ = 17100<br>$M_w$ = 29500<br>$M_w/M_n$ = 1.72 | 9020 |
| NRBU4 | 17600 | $M_n$ = 7740<br>$M_w$ = 13200<br>$M_w/M_n$ = 1.71 | 4400 |
| NRBU5 | 18200 | $M_n$ = 8770<br>$M_w$ = 15800<br>$M_w/M_n$ = 1.80 | 4600 |
| NRBU6 | 37000 | $M_n$ = 11250<br>$M_w$ = 16800<br>$M_w/M_n$ = 1.49 | 9200 |

Formulation of Radiation Curable Coating Compositions

Mixtures of NRBU Components 1, 2, and 4-6 with Photomer 4003 diluent (at ~6:4 wt. ratio) or NRLU Component 3, poly(propylene glycol)diacrylate with molecular weight of about 2000 (PPGDA2000), poly(propylene glycol)diacrylate with molecular weight of about 900 (PPGDA900) and other components of the compositions as specified in Table 3 below (isobornyl acrylate (IBOA), caprolactone acrylate (SR495), Lucerin TPO photoinitiator (TPO), N-vinylcaprolactone, BR3741, and/or Irganox 1035) were blended in the dark with mild heating until uniform.

The prepared composition formulations are summarized in Table 3 below. In each formulation, the curable cross-linker that is essentially free of urethane and urea functional groups, the curable diluent(s), Components 1-6, and photoinitiator components total 100 weight percent. The NRBU Components 1, 2, and 4-6 were introduced into the formulations as a mixture with Photomer 4003, which is a consequence of using Photomer 4003 during the reactions in the manner described in Example 1. For example, in Formulation 1, 35 wt. percent of NRBU1 in Photomer 4003 diluent was added, which given the 6:4 weight ratio resulted in the introduction of 21 wt. percent NRBU1 and 14 wt. percent Photomer 4003. The antioxidant (Irganox 1035) was added in excess (in pph).

TABLE 3

Primary Coating Formulations

| Formulation | Wt. % or pph | Component |
|---|---|---|
| 1 | 21 | NRBU1 |
|  | 42 | PPGDA2000 |
|  | 20 | IBOA |
|  | 14 | Photomer 4003 |
|  | 3 | TPO |
|  | 1 pph | Irganox 1035 |
| 2 | 21 | NRBU2 |
|  | 42 | PPGDA2000 |
|  | 20 | IBOA |
|  | 14 | Photomer 4003 |
|  | 3 | TPO |
|  | 1 pph | Irganox 1035 |
| 3 | 21 | NRBU1 |
|  | 35 | PPGDA2000 |
|  | 5 | PPGDA900 |
|  | 22 | IBOA |
|  | 14 | Photomer 4003 |
|  | 3 | TPO |
|  | 1 pph | Irganox 1035 |
| 4 | 21 | NRBU2 |
|  | 35 | PPGDA2000 |
|  | 5 | PPGDA900 |
|  | 22 | IBOA |
|  | 14 | Photomer 4003 |
|  | 3 | TPO |
|  | 1 pph | Irganox 1035 |
| 5 | 21 | NRBU1 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | Irganox 1035 |
| 6 | 21 | NRBU2 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | Irganox 1035 |
| 7 | 21 | NRBU1 |
|  | 30 | PPGDA2000 |
|  | 25 | IBOA |
|  | 14 | Photomer 4003 |
|  | 7 | SR495 |
|  | 3 | TPO |
|  | 1 pph | Irganox 1035 |
| 8 (Control) | 50 | NRLU3 |
|  | 45 | Photomer 4003 |
|  | 2 | N-Vinylcarpolactone |
|  | 3 | TPO |
|  | 1 pph | Irganox 1035 |
| 9 | 21 | NRBU4 |
|  | 30 | PPGDA2000 |
|  | 5 | PPGDA900 |
|  | 25 | IBOA |
|  | 14 | Photomer 4003 |

TABLE 3-continued

Primary Coating Formulations

| Formulation | Wt. % or pph | Component |
|---|---|---|
| | 2 | SR495 |
| | 3 | TPO |
| | 1 pph | Irganox 1035 |
| 10 | 21 | NRBU5 |
| | 30 | PPGDA2000 |
| | 5 | PPGDA900 |
| | 25 | IBOA |
| | 14 | Photomer 4003 |
| | 2 | SR495 |
| | 3 | TPO |
| | 1 pph | Irganox 1035 |
| 11 | 21 | NRBU6 |
| | 30 | PPGDA2000 |
| | 5 | PPGDA900 |
| | 25 | IBOA |
| | 14 | Photomer 4003 |
| | 2 | SR495 |
| | 3 | TPO |
| | 1 pph | Irganox 1035 |
| 12 (Control) | 50 | BR3741 |
| | 45 | Photomer 4003 |
| | 2 | N-vinylcaprolactone |
| | 3 | TPO |
| | 1 pph | Irganox 1035 |
| 13 (Control) | 52 | PGDA8000 |
| | 45 | Photomer 4003 |
| | 3 | TPO |
| | 1 pph | Irganox 1035 |
| 14 | 35 | NRLU3 |
| | 30 | PPGDA2000 |
| | 5 | PPGDA900 |
| | 25 | IBOA |
| | 2 | SR495 |
| | 3 | TPO |
| | 1 pph | Irganox 1035 |
| 15 | 24 | NRBU2 |
| | 30 | PPGDA2000 |
| | 22 | IBOA |
| | 16 | Photomer 4003 |
| | 5 | SR495 |
| | 3 | TPO |
| | 1 pph | Irganox 1035 |
| 16 | 21 | NRBU1 |
| | 30 | PPGDA2000 |
| | 27 | IBOA |
| | 14 | Photomer 4003 |
| | 5 | SR495 |
| | 3 | TPO |
| | 1 pph | Irganox 1035 |
| 17 | 24 | NRBU1 |
| | 30 | PPGDA2000 |
| | 22 | IBOA |
| | 16 | Photomer 4003 |
| | 5 | SR495 |
| | 3 | TPO |
| | 1 pph | Irganox 1035 |

Preparation of Cured Films from Coating Formulations

Films for tensile property and $T_g$ measurements were prepared by drawing down the formulations on release paper using a 5 mil (~125 μm) draw down bar. Films were cured using a Fusion D lamp with a nitrogen purge. The films received a dose of approximately 1200 mJ/cm². All samples were allowed to condition overnight in a controlled environment at 23° C. and 50% relative humidity. The thickness of the cured films was ~80 nm.

Measurement of Cured Film Properties

Tensile properties of the cured films were measured using a Sintech MTS tensile test instrument according to procedures set forth in ASTM Standard D882-97. Films were cut to a specified length and width (15 cm×1.3 cm) and mounted in the test instrument. The gauge length used for testing was 5.1 cm and the test speed was 2.5 cm/minute. Young's modulus, tensile strength, and % elongation values were recorded.

The glass transition temperatures of selected cured films (cut to a length of 10 mm and a width of 10 mm) were determined from the maximum peak of the tan delta curves measured in tension on a Seiko-5600 DMS testing instrument at a frequency of 1 Hz and a scan rate of 1° C./min. Tan delta is defined as the loss modulus (E″) divided by storage modulus (E′).

Measurements of the Young's modulus, tensile strength, % elongation, and $T_g$ of the cured films are summarized in Table 4 below.

TABLE 4

Tensile Properties of Cured Films

| Coating Formulation | Young's Modulus (MPa) | Tensile Strength (MPa) | % Elongation | $T_g$ (° C.) |
|---|---|---|---|---|
| 1 | 1.04 ± 0.01 | 0.67 ± 0.11 | 85 ± 11 | |
| 2 | 1.09 ± 0.05 | 0.61 ± 0.09 | 77 ± 11 | |
| 3 | 1.08 ± 0.03 | 0.57 ± 0.08 | 72 ± 8 | |
| 4 | 1.00 ± 0.07 | 0.54 ± 0.13 | 77 ± 17 | −20.5 |
| 5 | 0.89 ± 0.07 | 0.66 ± 0.05 | 86 ± 3 | |
| 6 | 0.76 ± 0.05 | 0.35 ± 0.04 | 104 ± 11 | −16.6 |
| 7 | 0.79 ± 0.06 | 0.43 ± 0.03 | 79 ± 4 | −16.2 |
| 8 (Control) | not measured | not measured | not measured | |
| 9 | 0.77 ± 0.02 | 0.51 ± 0.07 | 85 ± 7 | |
| 10 | 1.20 ± 0.04 | 0.53 ± 0.10 | 68 ± 13 | |
| 11 | 1.34 ± 0.09 | 0.64 ± 0.06 | 64 ± 4 | |
| 12 (Control) | 0.48 ± 0.03 | 0.41 ± 0.03 | 138 ± 11 | |
| 13 (Control) | 0.37 ± 0.04 | 0.23 ± 0.04 | 136 ± 25 | |
| 14 | 1.35 ± 0.06 | 0.64 ± 0.07 | 61 ± 6 | |
| 15 | 0.94 ± 0.15 | 0.34 ± 0.11 | 115 ± 31 | −16.2 |
| 16 | 0.92 ± 0.05 | 0.83 ± 0.13 | 127 ± 15 | −10.6 |
| 17 | 0.68 ± 0.04 | 0.51 ± 0.15 | 107 ± 24 | −18.5 |

The experiments confirmed that use of acrylate functionality (Control Formulation 13) separately is unlikely to provide coatings having adequate mechanical properties. The acrylate-only formulation had reasonable modulus and elongation properties and it seemed that modifying the coating with some type of reinforcing material to increase tensile strength might be a viable approach. Consequently, it was examined whether a lightly covalently crosslinked acrylate coating could be reinforced using various types of virtual crosslinking mechanisms provided by non-reactive urethane components, preferably non-reactive branched urethane (NRBU) components. The intended interactions are illustrated schematically in FIG. 3. In the NRBU component, a number of urethane group containing branches radiate from a central core. This component does not contain any radiation curable functionality, and this differentiates the coating from the typical primary fiber coating compositions. Without being bound by belief, it is believed that the branches of the NRBU are sufficiently long that they become entangled in the acrylic coating network as it is formed during photopolymerization. These entanglements should behave as physical crosslinks (see FIG. 3) and should increase the tensile properties of the acrylic network. Also, the urethane linkages found along the branches should hydrogen bond to one another, providing additional reinforcement that is similar to that seen with reactive urethane/acrylate oligomers.

A typical primary fiber coating is exemplified by the Control Formulation 12, which is a urethane/acrylate coating based on BR3741 oligomer—a double PPG4000 polyol block diacrylate with theoretical molecular weight of about 9000. Assuming that the chemical crosslinks in the cured coating network are from the end groups of the difunctional BR3741 compound, the crosslink density of the resulting coating is approximately 8700 g/crosslink. The tensile properties of the Coating 12 are given in Table 4. It is assumed that the tensile properties of this coating are primarily due to the chemical crosslinking introduced by the BR3741 acrylate end groups, along with additional toughening provided by the non-covalent hydrogen bonding due to the urethane groups present in the compound.

It was of interest to estimate the relative importance of the covalent chemical crosslinks versus the additional effect of the H-bonding. To do this, two additional control formulations were evaluated. In the first (Formulation 8 in Table 3), the BR3741 urethane/acrylate compound was replaced with a linear urethane analogue having a similar structure, i.e. a double PPG4000 polyol block (NRLU3 in Table 1), but with non-reactive butoxy end groups replacing the polymerizable acrylate end groups found in BR3741. Formulation 8 is similar to the Formulation 12, except that, unlike BR3741, NRLU3 lacks radiation-curable terminal functional groups that are capable of providing covalent chemical crosslinks. Hydrogen bonding interactions from urethane groups, however, are still present in NRLU3. Not surprisingly, films of Formulation 8 were very weak and no tensile properties could be measured. The hydrogen bonding interactions in a linear urethane/acrylate compound, alone, in the absence of accompanying covalent chemical crosslinking groups, are insufficient to provide a fiber coating having suitable mechanical properties. In the second control formulation (Formulation 13), the BR3741 component was replaced by a poly(propylene glycol) diacrylate with a molecular weight of about 8000 (PPG8000DA)—close to the molecular weight of the BR3741. The acrylate end groups of the PPG8000DA will provide covalent chemical crosslinks. The resulting cured coating should have a crosslink density (7500 g/crosslink) similar to that of the Control Formulation 12, but will not have the additional hydrogen bonding interactions that are provided by the urethane groups of BR3741. While this coating has modulus and elongation values similar to the Control Formulation 12, the tensile strength is definitely reduced—likely a consequence of the absence of the urethane group (or other) hydrogen donors.

The control experiments indicate that independent use of either acrylate or urethane functionality is unlikely to provide coatings having adequate mechanical properties. The acrylate-only formulation, however, had reasonable modulus and elongation properties and it was surmised that modifying the coating with some type of reinforcing material to increase tensile strength would be a viable route to suitable fiber coatings. Consequently, it was examined whether a lightly covalently crosslinked acrylate coating could be reinforced through the physical crosslinking interactions expected from non-reactive urethane oligomers, preferably non-reactive branched urethane (NRBU) compounds. The concept is illustrated schematically in FIG. 3. In a NRBU compound, a number of branches containing urethane groups extend from a central molecular core. The NRBU lacks radiation-curable functionality, and this feature differentiates NRBU-containing coatings from the typical primary fiber coating compositions. The branches of the NRBU are made to be sufficiently long to become entangled in the acrylic coating network that forms during photopolymerization of the radiation-curable components of the coating composition. The entanglements are expected to provide physical crosslinks (see FIG. 3) that should lead to an increase in the tensile properties of the acrylic network. Also, the urethane linkages found along the branches of the NRBU component will hydrogen bond to one another, providing an additional reinforcement mechanism that is expected to be similar to that seen with reactive urethane/acrylate oligomers.

A number of formulations were prepared to evaluate the NRBU compounds as toughening agents in a weakly crosslinked acrylic network (Table 3). The core acrylic network was formed from various combinations of poly(propylene glycol) diacrylate having molecular weight of approximately 900 or 2000 (PPG900DA and PPG2000DA), isobornyl acrylate (IBOA), and caprolactone acrylate (SR495). The examples given are representative to establish proof of principle for use of a NRBU compound to toughen cured products of the coating composition.

The tensile properties of cured films of the various NRBU and NRLU formulations in Table 3 are given in Table 4. A number of these formulations had suitable properties consistent with their use as primary fiber coatings, e.g., Young's modulus less than about 2 MPa, more preferably about 1 MPa or less, and adequate tensile strength, i.e., about 0.4 MPa or greater. While Formulations 1-7, 9-11, and 14-17 met these criteria, Formulations 4, 6, 7 and 15-17 appeared to exhibit the best combination of mechanical properties.

Formulation 11, made from NRBU6 (in which the size of the NRBU branch is larger), showed an increased modulus. The increased modulus could be indicative of an increase in the number of physical entanglements as the size of the branch increases. However, an increase in modulus was also seen in Formulation 14, containing a non-reactive linear analog of BR3741, which has a linear molecular weight similar to the molecular weight of the NRBU branch in NRBU6 of Formulation 11. The modulus also is elevated in Formulation 10, which used NRBU5, a compound based on the higher molecular weight Tetronic 701 core. However, Formulation 9, which was also made with an NRBU compound (NRBU4) based on the Tetronic core having similar molecular weight properties (but including IPDI instead of H12MDI as the diisocyanate), did not show a significant modulus increase.

In certain embodiments, the cured primary coating has a Young's modulus, when configured as a cured film of thickness ~80 μm, of less than about 2 MPa, preferably less than about 1.25 MPa, more preferably less than about 1.0 MPa. Lower Young's modulus values for cured films of thickness ~80 μm are most preferred, for example, less than about 0.9 MPa, 0.8 MPa, or 0.7 MPa. Preferably, the cured primary coating, when configured as a film of thickness ~80 μm, has a tensile strength of at least about 0.2 MPa, more preferably at least about 0.3, 0.4, or 0.5 MPa, even more preferably at least about 0.6 MPa, 0.7 MPa, or 0.8 MPa. In certain embodiments, the tensile strength of the cured primary coating, when configured as a film of thickness ~80 μm, is at least about 50% of the Young's modulus of the coating, more preferably at least about 75% of the Young's modulus of the coating. The cured primary coating, when configured as a film of thickness ~80 μm, has an elongation at break of at least about 70%, more preferably at least about 80%, even more preferably at least about 90%, and most preferably at least about 100%.

Figure 5:
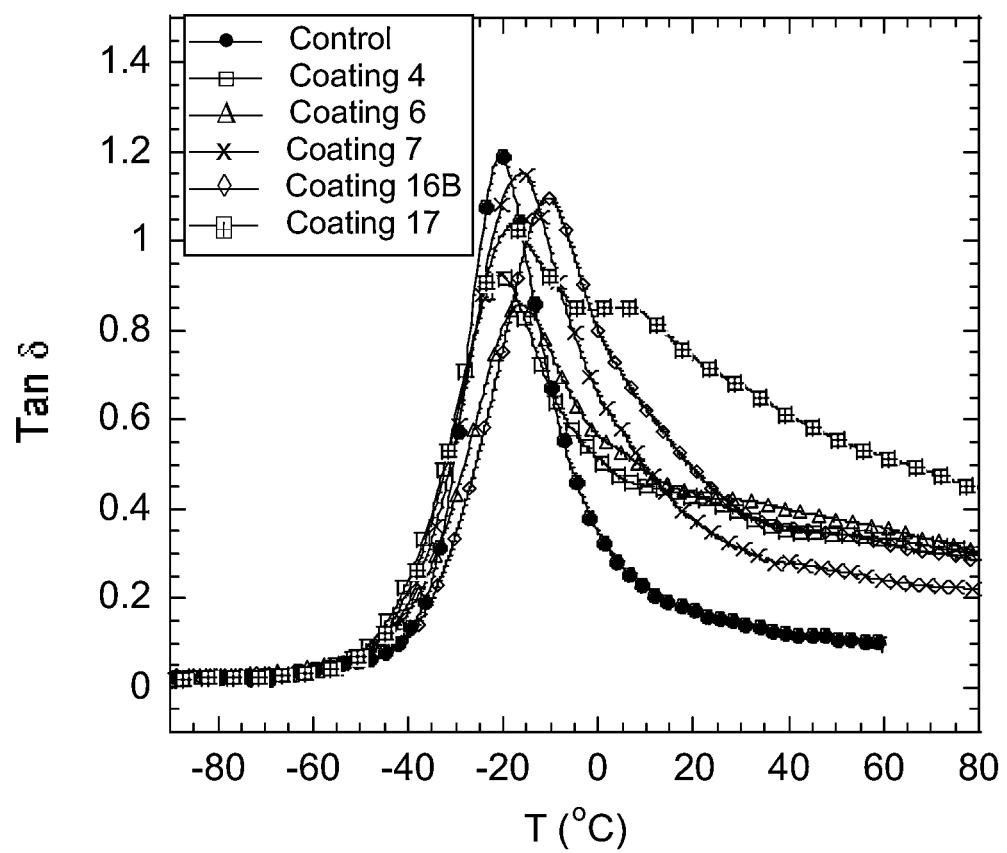
FIG. 5 is a graph of the dynamic mechanical analysis of several primary coatings compared to a control primary coating. In this curve, tan delta (loss modulus/elastic modulus) is plotted against changes in temperature at a frequency of 1 Hz.

An assessment of the mechanical damping properties of the primary coating formulations was conducted. To quantify damping, one typically examines the loss modulus (E")

or tan delta (E"/E') versus temperature at a particular deformation frequency (e.g., 1 Hz). FIG. 5 illustrates tan delta versus temperature for cured films with thickness ~80 μm of a control commercial urethane-acrylate coating (Desolite® 951-092 (DSM Desotech, Inc, Elgin Ill.)), and coatings 4, 6, 7, 16B, and 17. The results show that, compared to the control, the inventive coatings have a much broader tan delta function. The tan delta function is broadened because these formulations contain a component (the NRBU component) that is not chemically attached to the crosslinked polymer network.

Higher values of E" or tan delta indicate that the material is lossy in that molecular modes of relaxation dissipate input mechanical stress effectively. Typically a viscoelastic material has the greatest amount of mechanical dissipation at the peak in tan delta on a frequency or temperature axis. This maximum occurs at the glass transition temperature. To the extent that the curve can be broadened such that the tan delta property remains relatively higher over a larger temperature range, then the coating should be better at dissipating mechanical stress. Without being bound by belief, it is believed that a coating that dissipates mechanical stress efficiently might be more effective in mitigating microbend loss in an optical fiber.

In certain embodiments, the cured primary coating with NRBU component is characterized by a broadening of its tan delta vs. temperature curve relative to primary coatings lacking a non-radiation curable component comprising (thio)urethane and/or (thio)urea groups. In particular, the broadening of the tan delta curve is evident as a shallower slope of the curve at temperatures above the Tg. This means that the present cured primary coatings will exhibit, relative to an otherwise identical control coating lacking a non-radiation curable component comprising (thio)urethane and/or (thio)urea groups, an enhanced ability to dissipate or absorb mechanical stress at temperatures above the Tg. In certain embodiments, the tan delta value exceeds 0.9 over a temperature range that is greater than 12° C., more preferably greater than 13° C., even more preferably greater than 14° C. In certain embodiments, the tan delta value exceeds 0.8 over a temperature range that is greater than 15° C., more preferably greater than 20 or 25° C., even more preferably greater than 30 or 35° C. In certain embodiments, the tan delta value exceeds 0.7 over a temperature range that is greater than 18 or 20° C., more preferably greater than 25 or 30° C., even more preferably greater than 35 or 40° C. In certain embodiments, the tan delta value exceeds 0.6 over a temperature range that is greater than 22 or 25° C., more preferably greater than 30 or 35° C., even more preferably greater than 40 or 45° C.

Preparation and Testing of Optical Fibers

Based on the improved tan delta properties for the inventive coatings, it is expected that coated optical fibers possessing coatings with one or more NRBU components will exhibit improved microbend performance over a range of conditions. Fibers incorporating primary coatings formed by curing coating formulations 4, 6, 7, 15, 16, 16B, and 17 were prepared and evaluated in measurements of in situ Young's modulus, in situ $T_g$, wire mesh drum microbending loss, and basketweave microbending loss.

Separate fibers using coating formulations 4, 6, 7, 15, 16, and 17 as primary coating compositions were processed on a draw tower. The glass portion of the fiber was a G652 compliant single mode fiber having a diameter of about 125 μm. Primary coating formulations 4, 6, 7, 15, and 16 were applied to a glass fiber having a multisegment updoped silica core with a diameter of ~8 μm surrounded by a silica cladding with an outer diameter of ~125 μm. Primary coating formulations 16 and 17 were applied to a glass fiber having a multisegment core with a diameter of ~19 μm that included a central updoped silica region and a downdoped silica region adjacent the cladding, where the multisegment core is surrounded by a silica cladding with an outer diameter of ~125 μm. The fiber coated with primary formulation 16 having the larger core diameter is designated 16B.

A common secondary coating composition was also applied to each fiber during the draw. The secondary composition included the following components:

| Component | Amount |
|---|---|
| SR601 or Photomer 4028 | 72 wt % |
| CD9038 | 10 wt % |
| Photomer 3016 | 15 wt % |
| TPO | 1.5 wt % |
| Irgacure184 | 1.5 wt % |
| DC190 | 1.0 pph |
| Irganox1035 | 0.5 pph | where SR601 or Photomer 4028 (a polyfunctional monomer) is ethoxylated (4)bisphenol A diacrylate, CD9038 (a polyfunctional monomer) is ethoxylated (30)bisphenol A diacrylate, Photomer 3016 (a polyfunctional monomer) is bisphenol A epoxy diacrylate monomer; TPO (a photoinitiator) is 2,4,6-trimethylbenzoyl-diphenylphosphine oxide (available from BASF); Irgacure184 (a photoinitiator) is 1-hydroxycyclohexylphenyl ketone (available from BASF); Irganox1035 (an antioxidant) is thiodiethylene bis(3,5-di-tert-butyl)-4-hydroxyhydrocinnamate (available from BASF); DC190 (a fluid slip additive) is a silicone-ethylene oxide/propylene oxide copolymer (available from Dow Corning).

When configured as a cured rod having a diameter of 0.022", the secondary coating had a Young's modulus of ~1800 MPa, a tensile strength of ~60 MPa, a yield stress of ~45 MPa, and a % strain at break of ~35%.

The drawing tower was equipped with UV-curing capability. The UV radiation dose provided to the optical fiber is controlled by the speed of the fiber manufacturing process, the number of UV radiation curing lamps used and the intensity of those UV lamps. High cure speeds translate into the ability of the coating to cure at a certain dose. The curing system employed herein was manufactured by Fusion UV Systems, Inc., Maryland, USA. The curing system included UV curing lamps (1250 lamp systems equipped with D-bulbs), a P160 power supply, and an F10T door reflector. Curing was accomplished by focusing the UV radiation from the lamps on the optical fiber following application of the primary and secondary coating compositions.

The lamp/speed ratio is an indication of the UV radiation dose provided to the optical fiber. Lamp/speed ratio as used herein is defined as the ratio of the number of 1250 UV radiation curing lamps to the draw speed of the optical fiber in meters/second. For example, a draw tower that operates at a draw speed of 15 m/s with 3 lamps for the primary coating and 3 lamps for the secondary coating has a lamp/speed ratio of 6/15=0.4. Lamp/speed ratio reported herein is based on the configuration of the Fusion UV curing system employed herein and the fiber draw speed. The lamp/speed ratios used for the fibers of this example were 0.27 (fibers coated with primary formulations 4, 7, 15, 16, and 16B), 0.23 (fiber coated with primary formulation 6), and 0.28 (fiber coated with primary formulation 17).

The curing conditions were adjusted to provide a primary coating with a thickness of ~32.5 nm (outer diameter of fiber with primary coating of ~190 nm) and a secondary coating with a thickness of ~26 nm (outer diameter of fiber with primary and secondary coatings of ~242 nm). All fibers showed a high degree of cure and initial inspection of the fibers showed them to be relatively free of defects. Control fibers with the same glass portion, same secondary coating composition, and same dimensions were prepared using two commercially available primary coating compositions (CPC6 and CPC6i) that included radiation-curable urethane oligomers and lacked a NRBU component.

Measurements of the primary in situ Young's modulus and in situ glass transition temperature ($T_g$) were completed for each fiber. $T_g$ was also measured for samples of the primary coating compositions configured as thin films.

The primary in situ Young's modulus was measured using the following procedure. A six-inch sample of fiber was obtained and a one-inch section from the center of the fiber was window stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was moved and a small dot of Krazy® glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the primary in situ Young's modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

Primary in situ Young's modulus measurements were performed on a Rheometrics DMTA IV dynamic mechanical testing apparatus at a constant strain of 9e-6 1/s for a time of forty-five minutes at room temperature (21° C.). The gauge length was 15 mm. Force and delta length were recorded and used to calculate the in situ modulus of the primary coating. The tab-mounted fiber samples were prepared by removing any epoxy from the tabs that would interfere with the 15 mm clamping length of the testing apparatus to insure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed and the sample was removed once the analysis was completed.

In situ $T_g$ measurements were performed on fiber tube-off samples obtained from coated fibers. The fiber tube-off samples were obtained using the following procedure:

A 0.0055 miller stripper was clamped down approximately 1 inch from the end of the coated fiber. This one inch region of fiber was plunged into a stream of liquid nitrogen and held in the liquid nitrogen for 3 seconds. The fiber was then removed from the stream of liquid nitrogen and quickly stripped to remove the coating. The stripped end of the fiber was inspected for residual coating. If residual coating remained on the glass fiber, the sample was discarded and a new sample was prepared. The result was a clean glass fiber and a hollow tube with intact primary and secondary coatings. The diameters of the glass, primary coating, and secondary coating were measured from the end-face of the unstripped fiber.

In situ $T_g$ of the fiber tube-off samples was run using a Rheometrics DMTA IV test instrument at a sample gauge length of 9 to 10 mm. The width, thickness, and length of the fiber tube-off sample were input to the "Sample Geometry" section of the operating program of the test instrument. The sample was mounted and then cooled to approximately −85° C. Once stable, the temperature ramp was run using the following parameters:

Frequency: 1 Hz
Strain: 0.3%
Heating Rate: 2° C./min.
Final Temperature: 150° C.
Initial Static Force=20.0 [g]
Static>Dynamic Force by=10.0 [%]

The in-situ Tg of a coating is defined as the maximum value of tan δ in a plot of tan δ as a function of temperature, where tan δ is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation.

The fiber tube-off samples exhibited distinct maxima in the tan δ plot for the primary and secondary coatings. The maximum at lower temperatures (about −40° C. or lower) corresponded to the in-situ Tg of the primary coating and the maximum at higher temperature (about 50° C. or higher) corresponded to the in-situ Tg of the secondary coating.

Fiber samples selected for measurements of tensile properties and $T_g$ were screened tested at 100 kpsi to weed out defective samples. In screen testing, the fiber sample is secured between two belted capstan assemblies and a 100 kpsi tensile stress is applied to the fiber. The capstan assemblies consisted of a capstan and a pinch belt. The fiber sample was secured between the pinch belt and capstan, and the pinch belts were used to apply a compressive load on the fiber. The compressive load was intended to isolate the portion of the fiber sample subjected to screen testing from tensions associated with the fiber payout and winding units of the screen-testing apparatus. An additional stress was imparted to the coatings of the fiber sample as each pinch belt was pressed toward or against its corresponding capstan. In particular, a uniform lateral squish load from compression of the pinch belt and a shear load, which depended on the stick/slip conditions at the coating-pinch belt and coating-capstan interfaces, were manifest on the fiber sample. The shear load is a consequence of the glass portion of the fiber pulling from within the fiber against the fiber coatings. Fiber samples that were unable to withstand the test conditions without the creation of defects were eliminated. Only fiber samples that passed the screening test at a tension of 100 kpsi were selected for measurements of tensile properties and $T_g$.

The measured in situ Young's modulus, in situ $T_g$, and film $T_g$ of screen-tested fiber samples that included each of the primary coatings are summarized in Table 5.

TABLE 5

Properties of Cured Coating Formulations Drawn on Fiber

| Primary Coating Formulation of Fiber | Primary In-Situ Young's Modulus (MPa) | Primary In-Situ $T_g$ (° C.) | Film $T_g$ (° C.) |
|---|---|---|---|
| Control A (CPC6) | 0.35-0.40 | −35.0 | −23 |
| Control B (CPC6i) | 0.23-0.28 | −50.0 | −32 |
| 4 | 0.79 ± 0.07 | −46.0 | −20.5 |
| 6 | 0.50 ± 0.03 | −45.6 | −16.6 |
| 7 | 0.41 ± 0.01 | −45.3 | −16.2 |
| 15 | 0.32 ± 0.03 | −43.9 | −16.2 |
| 16 | 0.49 ± 0.05 | −42.5 | −10.6 |
| 16B | 0.36 ± 0.03 | −41.4 | −10.6 |
| 17 | 0.31 ± 0.04 | −42.5 | −18.5 |

The in situ modulus results indicate that fibers with primary coatings formed from a radiation-curable composition that included a radiation-curable component without urethane or urea groups and a non-radiation-curable NRBU component that included urethane groups had properties that were comparable to control fibers with primary coatings prepared from conventional radiation-curable urethane oligomers. The results indicate that cured coatings formed from the exemplary NRBU coating compositions described herein have characteristics suitable for use as primary coatings for optical fibers.

In one embodiment, the primary in situ Young's modulus of a cured coating formed from a coating composition with NRBU component is less than 1 MPa. In another embodiment, the primary in situ Young's modulus of a cured coating formed from a coating composition with NRBU component is less than 0.8 MPa. In still another embodiment, the primary in situ Young's modulus of a cured coating formed from a coating composition with NRBU component is less than 0.6 MPa.

In one embodiment, the primary in situ $T_g$ of a cured coating formed from a coating composition with NRBU component is less than −15° C. In another embodiment, the primary in situ $T_g$ of a cured coating formed from a coating composition with NRBU component is less than −30° C. In still another embodiment, the primary in situ $T_g$ of a cured coating formed from a coating composition with NRBU component is less than −35° C. In yet another embodiment, the primary in situ $T_g$ of a cured coating formed from a coating composition with NRBU component is less than −40° C. In a further embodiment, the primary in situ $T_g$ of a cured coating formed from a coating composition with NRBU component is less than −45° C.

In one embodiment, the $T_g$ of a cured film of thickness ~80 μm formed from a coating composition with NRBU component is less than 0° C. In another embodiment, the $T_g$ of a cured film of thickness ~80 μm formed from a coating composition with NRBU component is less than −10° C. In still another embodiment, the $T_g$ of a cured film of thickness ~80 μm formed from a coating composition with NRBU component is less than −15° C. In a further embodiment, the $T_g$ of a cured film of thickness ~80 μm formed from a coating composition with NRBU component is less than −20° C.

Measurement of Microbend Loss

Microbend losses of the fibers were assessed in wire mesh drum and basketweave tests. In the wire mesh drum test, the attenuation of light at wavelengths of 1310 nm, 1550 nm, and 1625 nm through a coated fiber having a length of 750 m was determined at room temperature. The microbend induced attenuation was determined by the difference between a zero tension deployment and a high tension deployment on the wire mesh drum. Separate measurements were made for two winding configurations. In the first configuration, the fiber was wound in a zero tension configuration on a plastic drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire mesh covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire drum measurement was performed after a dwell time of 1-hour. The increase in fiber attenuation (in dB/km) in the measurement performed in the second configuration (wire mesh covered drum) relative to the first configuration (smooth drum) was determined for each wavelength. The average of three trials was determined at each wavelength and is reported as the wire mesh microbend loss of the coated fibers in Table 6.

TABLE 6

Wire Mesh Microbend Loss

| Primary Coating Formulation of Fiber | 1310 nm (db/km) | 1550 nm (db/km) | 1625 nm (db/km) |
|---|---|---|---|
| Control A (CPC6) | 0.06 | 0.16 | 0.25 |
| Control B (CPC6i) | 0.01 | 0.05 | 0.07 |
| 4 | 0.019 | 0.073 | 0.121 |
| 6 | 0.010 | 0.040 | 0.073 |
| 7 | 0.014 | 0.056 | 0.114 |
| 15 | 0.0012 | 0.012 | 0.021 |
| 16 | 0.018 | 0.017 | 0.027 |
| 16B | −0.004 | 0.008 | 0.028 |
| 17 | 0.024 | 0.039 | 0.046 |

The results indicate that fibers having a primary coating formed by curing a coating composition with NRBU component in accordance with the present exemplary embodiments exhibit microbending losses that are as good or better than the microbending losses observed in control fibers having primary coatings made from compositions lacking a NRBU component.

In one embodiment, the wire mesh drum microbend loss of a fiber having a cured primary coating formed from a coating composition with NRBU component and a secondary coating with a Young's modulus, when configured as cured rod having a diameter of about 0.022", of at least 1400 MPa is less than 0.025 db/km at 1310 nm, less than 0.020 db/km at 1550 nm, and/or less than 0.10 db/km at 1625 nm. In another embodiment, the wire mesh drum microbend loss of a fiber having a cured primary coating formed from a coating composition with NRBU component and a secondary coating with a Young's modulus, when configured as cured rod having a diameter of about 0.022", of at least 1400 MPa is less than 0.020 db/km at 1310 nm, less than 0.015 db/km at 1550 nm, and/or less than 0.050 db/km at 1625 nm. In still another embodiment, the wire mesh drum microbend loss of a fiber having a cured primary coating formed from a coating composition with NRBU component and a secondary coating with a Young's modulus, when configured as cured rod having a diameter of about 0.022", of at least 1400 MPa is less than 0.015 db/km at 1310 nm, less than 0.010 db/km at 1550 nm, and/or less than 0.030 db/km at 1625 nm.

In the basketweave microbend loss test, the fibers were wound at high tension on a glass spool and exposed to a temperature cycle. The apparatus consisted of a fixed diameter silica drum. The drum surface was smooth. The drum diameter was approximately 110 mm. The fiber was wound onto the glass drum with a winding tension of 70 grams and a pitch of 2 mm (distance between adjacent wraps of fiber). Multiple layers of fiber were wrapped with this tension and pitch. The pitch angle was reversed with each layer wound. The crossover of the tensioned fibers from the adjacent layers creates the microbend mechanism. A fiber length of 2.5 km was used. The initial attenuation measurement was performed at 23° C.±5° C., 45%±25% RH with the fiber deployed in the basketweave configuration with 70 grams of tension. Initial attenuation loss measurements were made at wavelengths of 1310 nm, 1550 nm, and 1625 nm. An OTDR (optical time domain reflectometer) was used to acquire the attenuation loss data.

After the initial attenuation loss measurement at 23° C., the fiber was subjected to thermal cycling. In the thermal cycling, the fiber was first cooled from 23° C. to −40° C. at a rate of 1° C./min. The fiber was maintained at −40° C. for 20 hours and then heated at a rate of 1° C./min back to 23° C. The fiber was maintained at 23° C. for 2 hours, then heated to 70° C. at a rate of 1° C./min and maintained at 70° C. for 20 hours. The fiber was then cooled to 23° C. at a rate of 1° C./min and maintained at 23° C. for two hours. The cycle from 23° C. to −40° C. to 23° C. to 70° C. to 23° C. was repeated. After maintaining the fiber at 23° C. for two hours after the second cycle, the fiber was once again cooled to −40° C. at a rate of 1° C./min, held at −40° C. for 20 hours, and then further cooled at a rate of 1° C./min to −60° C. The fiber was held at −60° C. for 20 hours, then heated at a rate of 1° C./min back to 23° C. and held at 23° C. for 2 hours. The thermal cycling was concluded at this point.

During the thermal cycling, the attenuation loss of the fiber was measured continuously. The maximum attenuation loss over the two thermal cycles down to −40° C. was determined and the difference between this maximum attenuation loss and the initial attenuation loss at 23° C. is reported herein as the basketweave microbend loss of the fiber over the temperature range from −40° C. to 70° C. In the thermal cycle down to −60° C., the difference between the attenuation loss measured at −60° C. and the initial attenuation loss at 23° C. is reported herein as the basketweave microbend loss of the fiber over the temperature range from −60° C. to 23° C. The basketweave microbend loss test results are presented in Tables 7 and 8 below. Higher basketweave microbend losses were observed upon thermal cycling down to −60° C. than for temperatures in in the range from −40° C. to 70° C.

TABLE 7

Basketweave Microbend Loss (following thermal cycling over the temperature range from −40° C. to 70° C.)

| Primary Coating Formulation of Fiber | 1310 nm (dB/km) | 1550 nm (dB/km) | 1625 nm (dB/km) |
| --- | --- | --- | --- |
| Control A (CPC6) | 0.04 | 0.074 | 0.1 |
| Control B (CPC6i) | 0.01 | 0.005 | 0.01 |
| 4 | 0.0004 | 0.003 | 0.007 |
| 6 | 0.004 | 0.003 | 0.001 |
| 7 | 0.005 | 0.016 | 0.029 |
| 15 | 0.004 | 0.004 | 0.006 |
| 16 | 0.004 | 0.003 | 0.006 |
| 16B | 0.004 | 0.004 | 0.006 |
| 17 | 0.003 | 0.004 | 0.005 |

TABLE 8

Basketweave Microbend Loss (following thermal cycling over the temperature range from −60° C. to 23° C.)

| Primary Coating Formulation of Fiber | 1310 nm (dB/km) | 1550 nm (dB/km) | 1625 nm (dB/km) |
| --- | --- | --- | --- |
| Control A (CPC6) | 0.25 | 0.43 | 0.56 |
| Control B (CPC6i) | 0.02 | 0.04 | 0.05 |
| 4 | 0.005 | 0.017 | 0.027 |
| 6 | 0.009 | 0.025 | 0.030 |
| 7 | 0.025 | 0.067 | 0.099 |
| 15 | 0.010 | 0.023 | 0.031 |
| 16 | 0.009 | 0.017 | 0.024 |
| 16B | 0.014 | 0.034 | 0.046 |
| 17 | 0.008 | 0.023 | 0.030 |

The basketweave test results indicate that fibers having primary coatings formed by curing a composition with an NRBU component as disclosed herein have consistently lower microbend losses than control fibers that lack an NRBU component.

In one embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −40° C. to 70° C. is less than 0.015 db/km at 1310 nm, less than 0.015 db/km at 1550 nm, and/or less than 0.015 db/km at 1625 nm. In another embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −40° C. to 70° C. is less than 0.010 db/km at 1310 nm, less than 0.010 db/km at 1550 nm, and/or less than 0.010 db/km at 1625 nm. In still another embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −40° C. to 70° C. is less than 0.005 db/km at 1310 nm, less than 0.005 db/km at 1550 nm, and/or less than 0.005 db/km at 1625 nm.

In one embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −60° C. is less than 0.020 db/km at 1310 nm, less than 0.040 db/km at 1550 nm, and/or less than 0.060 db/km at 1625 nm. In another embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −60° C. is less than 0.015 db/km at 1310 nm, less than 0.030 db/km at 1550 nm, and/or less than 0.045 db/km at 1625 nm. In still another embodiment, the basketweave microbend loss of a fiber having a cured primary coating formed from a coating composition with NRBU component and a secondary coating with a Young's modulus, when configured as cured rod having a diameter of about 0.022", of at least 1400 MPa following thermal cycling to a temperature in the range from −60° C. is less than 0.010 db/km at 1310 nm, less than 0.020 db/km at 1550 nm, and/or less than 0.030 db/km at 1625 nm.

The results indicate more generally that fibers with primary coatings formed by curing compositions that include a radiation-curable component that lacks or is essentially free of urethane and urea groups in combination with an NRBU component have primary in situ Young's modulus, primary in situ $T_g$, film $T_g$, wire mesh drum microbend loss, and basketweave microbend loss that are comparable to or superior to fibers with primary coatings formed from compositions that include a radiation-curable urethane or urea component without an NRBU component. The results demonstrate that inclusion of hydrogen bonding functionality in non-reactive or non-radiation-curable components of coating formulations suffices to achieve primary coatings with excellent performance attributes and that hydrogen bonding functionality may be lacking or minimized in radiation-curable components of the coating formulation without comprising performance.

It will be apparent to those skilled in the art that numerous modifications and variations can be made to the exemplary embodiments without departing from the intended spirit and scope encompassed by the exemplary embodiments described herein. Thus it is intended that the scope encompassed by the exemplary embodiments covers all modifications and variations that coincide with the scope of the appended claims and their equivalents.

What is claimed is:

1. A coated optical fiber comprising:
a glass fiber; and
a primary coating surrounding said glass fiber, said primary coating including the cured product of a radiation-curable composition comprising:
a first radiation-curable component; and
a non-radiation-curable component, said non-radiation-curable component including (thio)urethane and/or (thio)urea groups;
wherein said primary coating has an in situ Young's modulus of less than 1 MPa.

2. The coated optical fiber of claim 1, wherein said first radiation-curable component is essentially free of urethane and urea groups.

3. The coated optical fiber of claim 1, wherein said first radiation-curable component is a radiation-curable cross-linker.

4. The coated optical fiber of claim 1, wherein said first radiation-curable component is a radiation-curable diluent.

5. The coated optical fiber of claim 4, wherein said radiation-curable composition further includes a second radiation-curable component, said second radiation-curable component including a radiation-curable cross-linker.

6. The coated optical fiber of claim 5, wherein said radiation-curable composition includes 25-50 wt % of said radiation-curable diluent, 4-40 wt % of said radiation-curable cross-linker, and 15-35 wt % of said non-radiation-curable component.

7. The coated optical fiber of claim 5, wherein said cured product includes a network, said network including chemical bonds between said radiation-curable cross-linker and said radiation-curable diluent, said network excluding chemical bonds between said non-radiation-curable component and said radiation-curable cross-linker, said network further excluding chemical bonds between said non-radiation-curable component and said radiation-curable diluent.

8. The coated optical fiber of claim 1, wherein the non-radiation curable component is branched.

9. The coated optical fiber of claim 1, wherein the non-radiation curable component comprises a core moiety covalently linked to two or more block moieties, each of said block moieties comprising some of said (thio)urethane and/or (thio)urea groups.

10. The coated optical fiber of claim 9, wherein said block moieties terminate in a non-radiation-curable capping agent.

11. The coated optical fiber of claim 1, wherein said non-radiation curable component comprises a structure according to formulae (Ia) or (Ib)

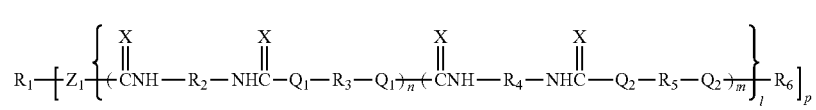

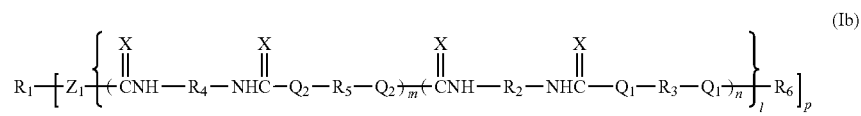

wherein,

R₁ is a multifunctional core moiety, where the number of functional groups of the core moiety is defined by p, where p is 2 or greater each X is independently S or O;

$Z_1$ is —O—, —S—, —N(H)—, or —N(alkyl)-;

each of $Q_1$ and $Q_2$ is independently —O—, —S—, —N(H)—, or —N(alkyl)-;

each of $R_2$ and $R_4$ is a core moiety of a di(thio)isocyanate reactant;

$R_3$ is a core moiety of a polyol or amine-capped polyol reactant;

$R_5$ is a hydrocarbon or oxygen-containing hydrocarbon having an average molecular weight of between about 28 to about 400;

$R_6$ is represented by the structure according to formula (II) or (III)

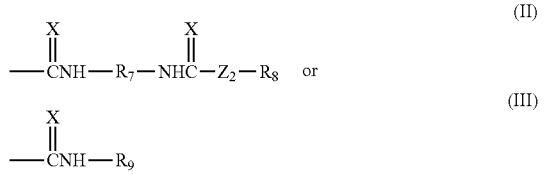

where X is defined as above, $Z_2$ is —O—, —S—, —N(H)—, or —N(alkyl)-, $R_7$ is a core moiety of a di(thio)isocyanate reactant, $R_8$ is a non-radiation curable capping agent, and $R_9$ is a core moiety of an isocyanate or thioisocyanate reactant;

l is 1 to 6;

m is greater than or equal to 0; and n is greater than or equal to 1.

12. The coated optical fiber of claim 1, wherein said non-radiation-curable component has a molecular weight between 4000 and 50000 daltons.

13. The coated optical fiber of claim 1, wherein said cured product, when configured as a film of thickness ~80 μm, has a tensile strength of at least 0.6 MPa.

14. The coated optical fiber of claim 1, wherein said primary coating has an in situ Young's modulus less than 0.6 MPa.

15. The coated optical fiber of claim 1, wherein said primary coating has an in situ $T_g$ less than –30° C.

16. The coated fiber of claim 1, further comprising a secondary coating, said secondary coating surrounding said primary coating, said secondary coating, when configured as a film of thickness cured rod having a diameter of 0.022″, having a Young's modulus of at least 1400 MPa and an average tensile strength of at least 45 MPa.

17. The coated optical fiber of claim 16, wherein said fiber has a wire mesh drum microbend loss of less than 0.020 db/km at a wavelength of 1310 nm, less than 0.015 db/km at a wavelength of 1550 nm, or less than 0.050 db/km at a wavelength of 1625 nm.

18. The coated optical fiber of claim 1, wherein said fiber has a basketweave microbend loss, following thermal cycling over a temperature range from –40° C. to 70° C., of less than 0.010 db/km at a wavelength of 1310 nm, less than 0.010 db/km at a wavelength of 1550 nm, or less than 0.010 db/km at a wavelength of 1625 nm.

19. The coated optical fiber of claim 1, wherein said fiber has a basketweave microbend loss, following thermal cycling from 23° C. to –60° C., of less than 0.015 db/km at a wavelength of 1310 nm, less than 0.030 db/km at a wavelength of 1550 nm, or less than 0.045 db/km at a wavelength of 1625 nm.

20. An optical fiber ribbon or bundle comprising:

a plurality of coated optical fibers according to claim 1; and a matrix encapsulating said plurality of coated optical fibers.

* * * * *